US008159755B2

(12) United States Patent
Katakura

(10) Patent No.: US 8,159,755 B2
(45) Date of Patent: Apr. 17, 2012

(54) ZOOM LENS AND IMAGE PICKUP APPARATUS USING THE SAME

(75) Inventor: Masahiro Katakura, Chofu (JP)

(73) Assignee: Olympus Imaging Corp., Tokyo (JP)

( * ) Notice: Subject to any disclaimer, the term of this patent is extended or adjusted under 35 U.S.C. 154(b) by 246 days.

(21) Appl. No.: 12/653,188

(22) Filed: Dec. 8, 2009

(65) Prior Publication Data

US 2010/0149656 A1    Jun. 17, 2010

(30) Foreign Application Priority Data

Dec. 17, 2008 (JP) ................................ 2008-320717

(51) Int. Cl.
G02B 15/14 (2006.01)
(52) U.S. Cl. ........................................ 359/682; 359/686
(58) Field of Classification Search .................. 359/676, 359/680, 682, 686; 396/72–88; 348/240.99–240.3, 348/335–369
See application file for complete search history.

(56) References Cited

U.S. PATENT DOCUMENTS

| 5,406,416 A * | 4/1995 | Ohtake ................... 359/686 |
| 2009/0073573 A1 * | 3/2009 | Kanetaka ................ 359/686 |

FOREIGN PATENT DOCUMENTS

| JP | 2004-318108 | 11/2004 |
| JP | 2004-318109 | 11/2004 |
| JP | 2006-138969 | 6/2006 |
| JP | 2007-327991 | 12/2007 |

* cited by examiner

Primary Examiner — Darryl J Collins
(74) Attorney, Agent, or Firm — Kenyon & Kenyon LLP

(57) ABSTRACT

A zoom lens includes:
a first lens group having two lens components including a negative lens component of negative refractive power and a positive lens component of positive refractive power;
a second lens group including a negative lens, a first positive lens and a second positive lens;
a fourth lens group having one lens component including a negative lens component having a concave surface directed to the object side;
the negative lens components in the first and fourth lens groups satisfying conditional formula (1):

$$-0.80 < r_{G1nr}/r_{G4nf} < -0.40 \quad (1),$$

where
$r_{G1nr}$ is the radius of paraxial curvature of the image side surface of the negative lens component in the first lens group; and
$r_{G4nf}$ is the radius of paraxial curvature of the object side surface of the negative lens component in the fourth lens group.

36 Claims, 18 Drawing Sheets

Example 1

Example 1

Example 2

Example 3

Example 4

Example 5

Example 6

Example 7

ZOOM LENS AND IMAGE PICKUP APPARATUS USING THE SAME

CROSS-REFERENCE TO RELATED APPLICATIONS

This application claims the benefit of Japanese Patent Application No. 2008-320717 filed in Japan on Dec. 17, 2008, the contents of which are incorporated herein by this reference.

BACKGROUND OF THE INVENTION

1. Field of the Invention

The present invention relates to a zoom lens. The present invention also relates to an image pickup apparatus having the same.

2. Description of the Related Art

In recent years, digital cameras designed to form an image of a target on the imaging surface of an image pickup element such as CCD or C-MOS sensor and electrically record the image have become popular to replace cameras of the type of exposing a film to light to form an image of a target. Digital cameras can be downsized if compared with cameras using a film by using a small image pickup element.

In the field of such digital cameras, so-called negative lead type zoom lenses that are advantageous for downsizing as disclosed in Patent Document 1 (JP-A-2004-318108), Patent Document 2 (JP-A-2004-318109) and Patent Document 3 (JP-A-2006-138969) are known. In a negative lead type zoom lens, a lens group of negative refractive power is arranged at the side closest to the object to be imaged, or the target.

Zoom lenses as disclosed in Patent Documents 1 through 3 have a first lens group of negative refractive power, a second lens group of positive refractive power, a third lens group of positive refractive power and a fourth lens group of negative refractive power arranged in this order from the object side to the image side. An excellent symmetry of refractive power is realized with a structure for the entire zoom lens by forming the first lens group by means of two components of a negative lens component and a positive lens component while forming the second lens group by means of three lenses including a positive lens, a negative lens and a positive lens. This simple structure secures excellent optical performance.

However, recently, there is an increasing demand for image pickup apparatus having a zoom lens that is small but secures a good angle of view at the wide angle end and a sufficient variable power ratio.

In view of the above-identified problem, the present invention provide a zoom lens that is compact but advantageous for realizing a wide angle of view and/or a high variable power ratio and also an image pickup apparatus having such a zoom lens.

In view of the above-identified problem, a zoom lens according to the present invention has a first lens group of negative refractive power, a second lens group of positive refractive power, a third lens group of positive refractive power and a fourth lens group of negative refractive power arranged in the above-mentioned order from the object side.

When the zoom lens is driven to zoom from the wide angle end to the telescopic end, at least the first lens group, the second lens group and the third lens group are driven to move and change the gaps separating the lens groups.

The first lens group is formed by two lens components including a negative lens component of negative refractive power and a positive lens component of positive refractive power that are arranged sequentially on the optical axis in the above-mentioned order from the object side to the image side with a gap separating them.

The second lens group includes a negative lens and a plurality of positive lenses. More preferably, the second lens group has three lenses including a positive lens, a negative lens and a positive lens that are arranged sequentially in the mentioned order from the object side to the image side. The lens components are lens bodies having only two refraction surfaces that contact air on the optical axis as object side surface and image side surface.

When a zoom lens according to the present invention has a focusing feature, it is focused at infinity at the time of shipment. This statement applies to all the compositional requirements and all the conditions shown hereinafter.

With this basic arrangement, the number of lens groups and the total number of lenses can be reduced and the image pickup apparatus can be downsized advantageously by arranging a lens group of negative refractive power at the object side.

Additionally, the principal point is placed at an object side position to make it advantageously possible to reduce the diameter of the first lens group and the total length of the zoom lens by forming the first lens group by two lens components as described above.

The second lens group is made to mainly take the role of a variator, while the first lens group and the third lens group take the role of a compensator and that of reducing the fluctuations of the exit pupil at the time of varying power as they are driven to move. Additionally, this arrangement is advantageous for correcting the field curvature.

As the fourth lens group of negative refractive power is placed at the image side relative to the third lens group, an excellent symmetry of refractive power is realized in the zoom lens so that aberrations can be corrected with ease in the entire zooming range. Particularly, this arrangement is advantageous for reducing the off-axial aberrations such as the field curvature at the wide angle end and the astigmatism.

The refractive power needs to be increased as the variable power ratio is raised in order for the second lens group to take the role of a variator. However, when the refractive power is simply increased, the aberrations are apt to fluctuate at the wide angle end and at the telescopic end. With the basic arrangement of the present invention, the second lens group is formed by means of three lenses including a positive lens, a negative lens and a positive lens arranged sequentially in the above-mentioned order from the object side, paying attention to the symmetry of refractive power of the zoom lens. Thus, as a result, an excellent symmetry of refractive power is realized in the second lens group and fluctuations of the aberrations at the wide angle end and at the telescopic end and the appearance of aberrations on the axis at the telescopic end can advantageously be suppressed.

A zoom lens in the first aspect of the present invention further includes a fourth lens group formed by a single negative lens component whose concave is made to face the object side in addition to the above-described basic arrangement and the negative lens component in the first lens group and the negative lens component in the fourth lens group are made to satisfy the requirements of conditional formula (1) shown below:

$$-0.80 < r_{G1nr}/r_{G4nf} < -0.40 \qquad (1),$$

where $r_{G1nr}$ is the radius of paraxial curvature of the image side surface of the negative lens component in the first lens group; and $r_{G4nf}$ is the radius of paraxial curvature of the object side surface of the negative lens component in the fourth lens group.

The conditional formula (1) specifies a favorable profile of the negative lens component of the first lens group and the fourth lens group of negative refractive power. When the image side concave of the negative lens component arranged at the extremity of the object side and the object side concave of the fourth lens group are made to satisfy the above requirements, the exit pupil can be arranged remotely from the image surface, while maintaining the symmetry. Then, as a result, the quantity of peripheral light can be prevented from being small and the color shading can be suppressed advantageously, while excellently correcting both the axial aberrations and the off-axial aberrations.

An excellent symmetry can be realized and particularly the off-axial aberrations can be reduced to make it possible to advantageously broaden the angle of view when the above upper limit is not exceeded.

Advantageously, the off-axial aberrations of higher order can be suppressed and the quantity of peripheral light can be secured, while the color shading can be reduced when the above lower limit is not exceeded and the curvature absolute value on the object side concave of the fourth lens group is suppressed. Additionally, the negative refractive power of the first lens group can be advantageously secured and a broadened angle of view and an increased variable power ratio can advantageously be realized.

In a zoom lens in the second aspect of the present invention, the negative lens component of the first lens group includes negative lenses that satisfy the requirements of conditional formula (2) shown below with the above-described basic arrangement:

$$1.78 < nd_{G1n} < 2.40 \quad (2),$$

where
$nd_{G1n}$ is the refractive index of any of the negative lenses in the negative lens component of the first lens group at d line.

The conditional formula (2) specifies a favorable refractive index of any of the negative lenses in the negative lens component of the first lens group. When the requirements of the above conditional formula are satisfied, the absolute value of the radius of curvature of each of the lens surfaces of the negative lens component of the first lens group can be reduced to advantageously make it possible to reduce the aberrations and secure the negative refractive power in the first lens group with ease at the same time. Additionally, the symmetry of profile of the negative lens component of the first lens group and the negative lens component of the fourth lens group can easily be maintained to advantageously make it possible to reduce the off-axial aberrations.

The negative refractive power of the first lens group can be secured and various aberrations can be reduced at the same time to advantageously make it possible to realize a broadened angle of view and an increased variable power ratio when the above lower limit is not exceeded.

The cost of the lens materials can advantageously be reduced when the above upper limit is not exceeded.

The negative lens component of the first lens group may include negative lenses that satisfy the requirements of the conditional formula (2) in the zoom lens in the first aspect of the present invention. Then, it is even more advantageously possible to realize a broadened angle of view and an increased variable power ratio.

The fourth lens group may be formed only by a single negative lens component in a zoom lens in the second aspect of the present invention. The function of the fourth lens group is mainly directed to correction of the field curvature. For this reason, the number of lens components preferably is reduced to make it advantageously possible to downsize the zoom lens.

In either aspect of the present invention, one or more than one the compositional requirements and the requirements of the conditional formulas are preferably satisfied at the same time.

Preferably, both the image side surface of the negative lens component of the first lens group and the object side surface of the fourth lens group are concave aspheric surfaces. When they are concave aspheric surfaces, the off-axial aberrations of higher orders can further advantageously be reduced at the wide angle end to advantageously ensure an excellent optical performance when a broadened angle of view and an increased variable power ratio are realized. Furthermore, when both the object side surface of the negative lens component of the first lens group and the image side surface of the fourth lens group are aspheric surfaces, the off-axial aberrations of higher order and the axial aberrations can advantageously be corrected by the four aspheric surfaces.

Both the negative lens component and the positive lens component of the first lens group are respectively formed by single lenses to advantageously reduce the weight and the cost of the first lens group.

Both the third lens group and the fourth lens group preferably respectively have single lens components. Then, the symmetry of refractive power for the set of the negative lens component and the positive lens component of the first lens group and the set of the third lens group and the fourth lens group can be established by a few number of the lens components to advantageously make it possible to downsize the zoom lens and ensure an excellent optical performance at the same time.

Additionally, both the third lens group and the fourth lens group preferably are formed by respective single lenses. Then, the size of the zoom lens can advantageously be reduced when the lens barrel is retracted and the zoom lens can be manufactured at low cost.

A zoom lens according to the present invention preferably satisfies the requirements of conditional formula (3) shown below:

$$0.1 < D_{G1np}/D_{G3G4} < 1.0 \quad (3),$$

where
$D_{G1np}$ is the distance between the negative lens component and the positive lens component of the first lens group on the optical axis; and
$D_{G3G4}$ is the distance between the third lens group and the fourth lens group on the optical axis at the telescopic end.

Thus, the first lens group of a zoom lens according to the present invention is formed by arranging a negative lens component and a positive lens component sequentially from the object side in the above-mentioned order to make it advantageously possible to reduce the size of the first lens group in diametrical directions and also the size of the entire zoom lens by placing the principal point of the first lens group at an object side position. Then, the field curvature can advantageously be corrected as the two lens components are arranged with a space separating them.

The conditional formula (3) specifies a preferable ratio of the air gap in the first lens group and the gap between the third lens group and the fourth lens group at the telescopic end. An excellent symmetry of the entire zoom lens is realized at the telescopic end to make it advantageously possible to correct the axial aberrations and the off-axial aberrations at the telescopic end.

An excellent symmetry is achieved for the optical system when the above lower limit is not exceeded. Additionally, a space for allowing the third lens group to move is secured when the third lens group needs to be driven to move for focusing.

The symmetry of the zoom lens can advantageously be maintained and made flat when the lens barrel is retracted by suppressing the air gap in the first lens group to an appropriate level provided that the above upper limit is not exceeded.

Preferably, the negative lens component of the first lens group satisfies the requirements of conditional formula (4) shown below:

$$-1.0<(r_{G1nf}+r_{G1nr})/(r_{G1nf}-r_{G1nr})<0.75 \qquad (4),$$

where
$r_{G1nf}$ is the radius of paraxial curvature of the object side surface of the negative lens component of the first lens group; and
$r_{G1nr}$ is the radius of paraxial curvature of the image side surface of the negative lens component of the first lens group.

The conditional formula (4) specifies a preferable profile of the negative lens component of the first lens group.

Advantageously, the curvature of the object side surface can be reduced when the above lower limit is not exceeded and both the field curvature at the wide angle end and the spherical aberration at the telescopic end can be reduced by reducing the curvature of the image side surface when the above upper limit is not exceeded.

Preferably, the second lens group satisfies the requirements of conditional formula (5) shown below:

$$0.10<f_{G2}/ft<0.55 \qquad (5),$$

where
$f_{G2}$ is the focal length of second lens group; and
ft is the focal length of the entire optical system of the zoom lens at the telescopic end.

The conditional formula (5) specifies a preferable refractive power level of the second lens group.

The axial aberrations can advantageously be reduced at the telescopic end by suppressing the refractive power of the second lens group to an appropriate level when the above lower limit is not exceeded.

The second lens group can be made to have a satisfactory variable power function by securing refractive power for the second lens group when the above upper limit is not exceeded to make it advantageously possible to reduce fluctuations of the aberrations both at the telescopic end and at the wide angle end and also reduce the size of the zoom lens when the lens barrel is retracted.

Preferably, the first lens group satisfies the requirements of conditional formula (6) shown below:

$$-0.70<f_{G1}/ft<-0.20 \qquad (6),$$

where
$f_{G1}$ is the focal length of first lens group; and
ft is the focal length of the entire optical system of the zoom lens at the telescopic end.

It is preferably to secure a sufficient level for the negative refractive power of the first lens group in order to realize a wide angle of view and/or a high variable power ratio. Since an excellent symmetry of refractive power is realized in a zoom lens according to the present invention, the zoom lens can be formed that the aberrations can be corrected with ease when a sufficient level is secured to the refractive power of the first lens group. The conditional formula (6) specifies a preferable level of refractive power for the first lens group.

Thus, the angle of view can be broadened and the variable power ratio can advantageously be raised in a zoom lens according to the present invention by securing the refractive power of the first lens group when the above lower limit is not exceeded.

Additionally, the off-axial aberrations can be reduced at the wide angle end by suppressing excessive negative refractive power when the above upper limit is not exceeded.

Preferably, the second lens group satisfies the requirements of conditional formula (7) shown below:

$$0.01<\sigma_{G2}/ft<0.25 \qquad (7),$$

where
$\sigma_{G2}$ is the thickness of the second lens group on the optical axis; and
ft is the focal length of the entire optical system of the zoom lens at the telescopic end.

The conditional formula (7) specifies a preferable thickness of the second lens group on the optical axis.

The thickness of the zoom lens can advantageously be reduced when the lens barrel is retracted provided that the above upper limit is not exceeded.

The lens can be prepared with ease and both the field curvature and the spherical aberration can be corrected with ease by securing a satisfactory thickness when the above lower limit is not exceeded.

Preferably, a zoom lens according to the present invention satisfies the requirements of conditional formula (8) shown below:

$$3.0<ft/fw<20.0 \qquad (8),$$

where
ft is the focal length of the entire optical system of the zoom lens at the telescopic end; and
fw is the focal length of the entire optical system of the zoom lens at the wide angle end.

The conditional formula (8) specifies a preferable zooming ratio of the zoom lens.

The zoom lens can accommodate various scenes to be shot when the above lower limit is not exceeded. However, if the zooming ratio exceeds the above lower limit, a three-group zoom lens or a two-group zoom lens can ensure a satisfactory optical performance.

The number of lens groups in the zoom lens and/or the entire length of the zoom lens can be suppressed when the above upper limit is not exceeded.

A zoom lens according to the present invention preferably is a four-group zoom lens having four lens groups including a first lens group, a second lens group, a third lens group and a fourth lens group. Four lens groups can realize an excellent symmetry of refractive power to advantageously make it possible to downsize the zoom lens and ensure an excellent optical performance at the same time.

Preferably, a zoom lens according to the present invention has an aperture stop that moves integrally with the second lens group when zooming from the wide angle end to the telescopic end. Such an arrangement is advantageous for reducing the diameter of the second lens group. The diameter of the flux of light in the second lens group can be reduced to make it advantageously possible to downsize the zoom lens and reduce the aberrations. While the aperture stop may be arranged at the object side or at the image side of the second lens group or even in the second lens group, advantageously the off-axial aberrations can be corrected and the thickness of the second lens group can be reduced at the same time when the aperture stop is arranged at the image side of the second lens group.

Preferably, an operation of shifting the focus from a remote object to a nearby object is conducted by moving only the third lens group toward the object side. Since the third lens group can be downsized and its focus driving range can be secured with ease, it is preferable to move this lens group when shifting the focus.

Preferably, the third lens group includes a cemented lens component having a negative lens and a positive lens. Then, the chromatic aberration of the third lens group can advantageously be corrected. Particularly, when the third lens group is a focusing lens group, the chromatic aberration of magnification can advantageously be reduced at the time of shifting the focus to a nearby object at the telescopic end.

Preferably, the fourth lens group is formed by a plastic single lens. Advantageously, both the cost and the weight of the lens barrel can be reduced by forming the fourth lens group by a plastic single lens. Additionally, the fourth lens group can be processed with ease when it is provided with an aspheric surface.

An image pickup apparatus according to the present invention has a zoom lens and an imaging plane arranged at the image side of the zoom lens as well as an image pickup element for converting the optical image on the imaging plane into electric signals, and the zoom lens thereof is a zoom lens as defined above.

Advantageously, a zoom lens as defined above can be downsized and the angle of view can be broadened while the variable power ratio can be raised and the exit pupil can be moved away from the image plane with ease. Therefore, such a zoom lens can be adopted for the imaging zoom lens of an image pickup apparatus.

Additionally and preferably, the fourth lens group is fixed relative to the imaging plane when zooming from the wide angle end to the telescopic end. When the fourth lens group is fixed, the mechanical configuration of the image pickup apparatus can be dramatically simplified to make it possible to reduce the thickness of the image pickup apparatus when the lens barrel is retracted and also reduce the cost.

An image pickup apparatus according to the present invention preferably has an image conversion section for converting the electric signals from the zoom lens that includes distortion into video signals in which the distortion is corrected by way of an image processing operation. An image picked up by a zoom lens is apt to produce a tradeoff relationship between distortion and astigmatism at the wide angle end. Therefore, the zoom lens can be downsized and the quality of the recorded image can be improved by optically correcting the astigmatism and electrically correcting the barrel-shaped distortion that is apt to be produced at the wide angle end before recording and/or displaying the image.

An image pickup apparatus according to the present invention preferably has an image conversion section for converting the electric signals from the zoom lens that includes chromatic aberration of magnification into video signals that are corrected by way of an image processing operation. For example, when distortion is electrically corrected on a color signal by color signal basis, the chromatic aberration of magnification is consequently corrected. Then, as a result, the chromatic aberration of magnification of the zoom lens itself can be shared to make it advantageously possible to reduce the cost of the materials and downsize the image pickup apparatus.

A zoom lens as defined below may be provided. Namely, there is provided a zoom lens including a first lens group of negative refractive power, a second lens group of positive refractive power, a third lens group of positive refractive power and a fourth lens group of negative refractive power arranged sequentially from the object side toward the image side in the above-mentioned order, at least the first lens group, the second lens group and the third lens group being driven to move, the gaps separating the lens groups being made to change when zooming from the wide angle end to the telescopic end;

the first lens group being formed by two lens components including a negative lens component of negative refractive power and a positive lens component of positive refractive power arranged on the optical axis from the object side toward the image side in the above mentioned order with a gap separating them;

the second lens group including a negative lens and a plurality of positive lenses but preferably including three lenses of a positive lens, a negative lens and a positive lens arranged sequentially from the object side toward the image side in the above mentioned order;

the fourth lens group being formed by a single negative lens component; and the zoom lens satisfying the requirements shown below:

$$4.0 < ft/fw < 20.0 \quad (8\text{-}1),$$

where ft is the focal length of the entire optical system of the zoom lens at the telescopic end, and fw is the focal length of the entire optical system of the zoom lens at the wide angle end.

A zoom lens as defined below may be provided. Namely, there is provided a zoom lens including a first lens group of negative refractive power, a second lens group of positive refractive power, a third lens group of positive refractive power and a fourth lens group of negative refractive power arranged sequentially from the object side toward the image side in the above mentioned order, at least the first lens group, the second lens group and the third lens group being driven to move while the fourth lens group is fixed, the gaps separating the lens groups being made to change when zooming from the wide angle end to the telescopic end;

the first lens group having a negative lens component arranged at the object side extremity;

the second lens group including a negative lens and a plurality of positive lenses but preferably including three lenses of a positive lens, a negative lens and a positive lens arranged sequentially from the object side toward the image side in the above mentioned order;

the fourth lens group including a negative lens component with its concave surface directed to the object side and the total number of lens components in the fourth lens group being one; and the negative lens component in the first lens group and the negative lens component in the fourth lens group satisfying the requirements of conditional formula (1) shown below:

$$-0.80 < r_{G1nr}/r_{G4nf} < -0.40 \quad (1),$$

where $r_{G1nr}$ is the radius of paraxial curvature of the image side surface of the negative lens component in the first lens group; and $r_{G4nf}$ is the radius of paraxial curvature of the object side surface of the negative lens component in the fourth lens group.

A zoom lens as defined below may be provided. Namely, there is provided a zoom lens including a first lens group of negative refractive power, a second lens group of positive refractive power, a third lens group of positive refractive power and a fourth lens group of negative refractive power arranged sequentially from the object side toward the image side in the above-mentioned order, at least the first lens group, the second lens group and the third lens group being driven to move, the gaps separating the lens groups being made to change when zooming from the wide angle end to the telescopic end;

the first lens group having a negative lens component arranged at the object side extremity;

the second lens group including a negative lens and a plurality of positive lenses but preferably including three lenses of a positive lens, a negative lens and a positive lens arranged sequentially from the object side toward the image side in the above mentioned order;

the fourth lens group including a negative lens component with its concave surface directed to the object side, the total number of lens components in the fourth lens group being one; and the zoom lens satisfying the requirements of conditional formula (8-1) shown below:

$$4.0 < ft/fw < 20.0 \quad (8\text{-}1),$$

where ft is the focal length of the entire optical system of the zoom lens at the telescopic end, and fw is the focal length of the entire optical system of the zoom lens at the wide angle end.

Preferably, each of the above-defined arrangements satisfies the plurality of requirements at the same time.

Each of the conditional formulas can be modified as follows to make its effect more reliable.

As for the conditional formula (1),
preferably, the lower limit is −0.75, more preferably −0.72; and
preferably, the upper limit is −0.50, more preferably −0.60.
As for the conditional formula (2),
preferably, the lower limit is 1.80, more preferably 1.85; and
preferably, the upper limit is 2.10, more preferably 1.90.
As for the conditional formula (3),
preferably, the lower limit is 0.2, more preferably 0.3; and
preferably, the upper limit is 0.8, more preferably 0.6.
As for the conditional formula (4),
preferably, the lower limit is 0.1, more preferably 0.5; and
preferably, the upper limit is 0.73, more preferably 0.70.
As for the conditional formula (5),
preferably, the lower limit is 0.30, more preferably 0.40; and
preferably, the upper limit is 0.45, more preferably 0.50.
As for the conditional formula (6),
preferably, the lower limit is −0.60, more preferably −0.55; and
preferably, the upper limit is −0.30, more preferably −0.40.
As for the conditional formula (7),
preferably, the lower limit is 0.10, more preferably 0.20; and
preferably, the upper limit is 0.24, more preferably 0.23.
As for the conditional formulas (8) and (8-1),
preferably, the lower limit is 4.0, 4.5, more preferably 4.8; and
preferably, the upper limit is 10.0, 8.0, more preferably 6.0.

As may be clear from the above description, the present invention can provide a zoom lens that is small but advantageous for realizing a wide angle of view and/or a high variable power ratio and also an image pickup apparatus having such a zoom lens.

Still other objects and advantages of the invention will in part be obvious and will in part be apparent from the specification.

The invention accordingly includes the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 1A is a cross-sectional view at the wide angle end, FIG. 1B is a cross-sectional view in an intermediate state and FIG. 1C is a cross-sectional view at the telescopic end;

DESCRIPTION OF EXEMPLARY EMBODIMENTS

Figure 1:
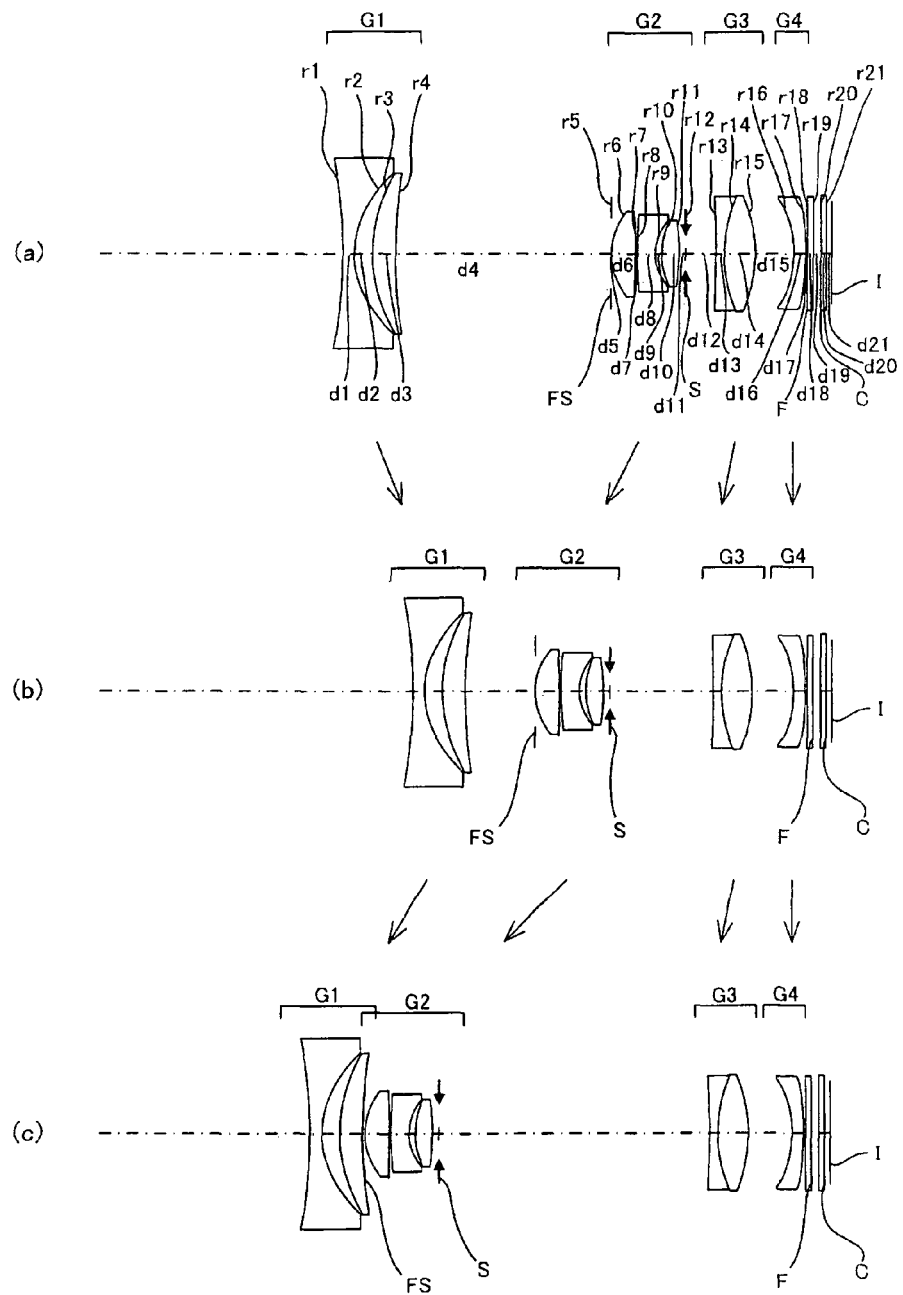
FIGS. 1A through 1C are cross-sectional views of Example 1 of zoom lens according to the present invention when focused at an object at infinity.
Figure 2:
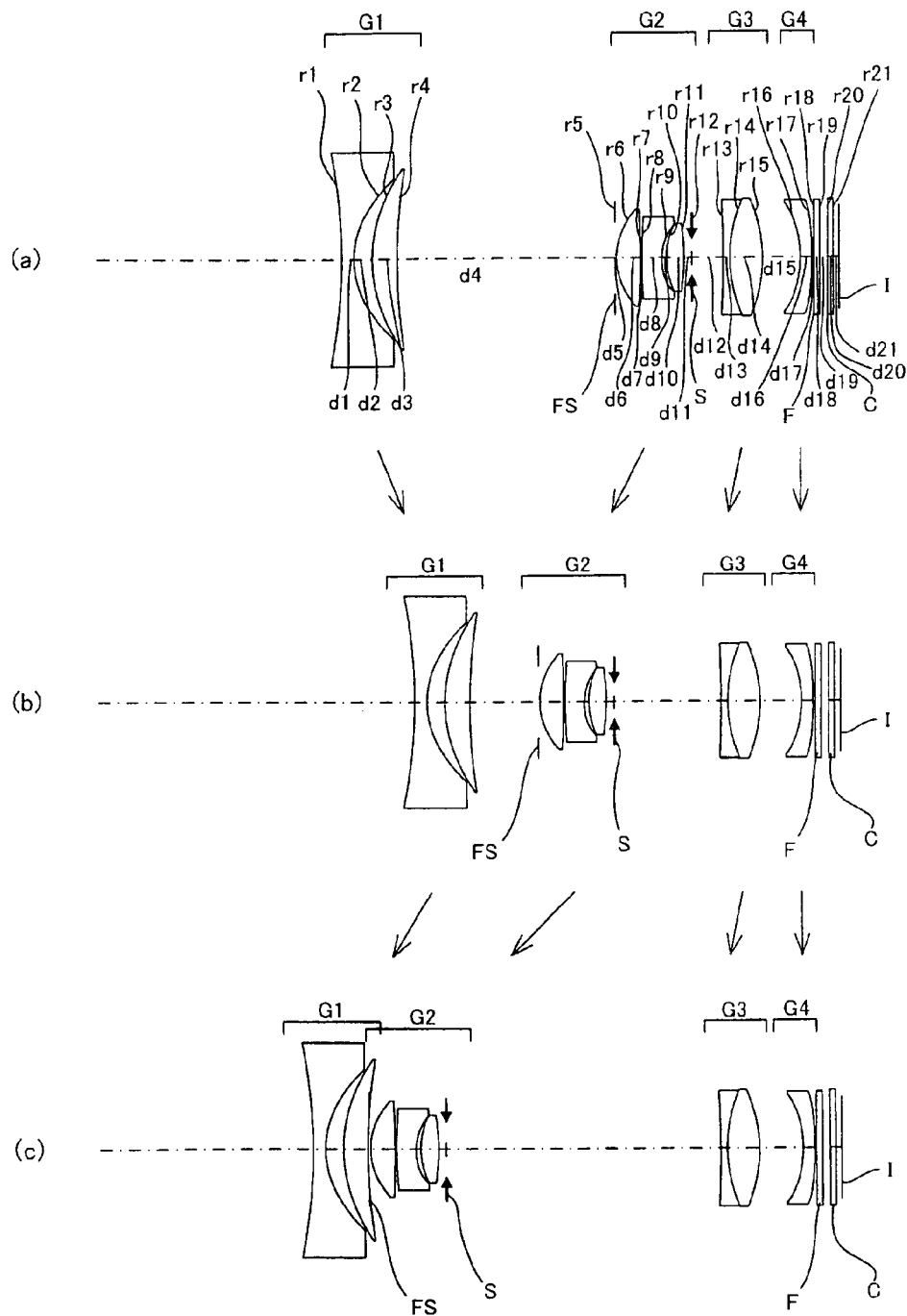
FIGS. 2A through 2C are cross-sectional views of Example 2 similar to FIGS. 1A through 1C.
Figure 3:
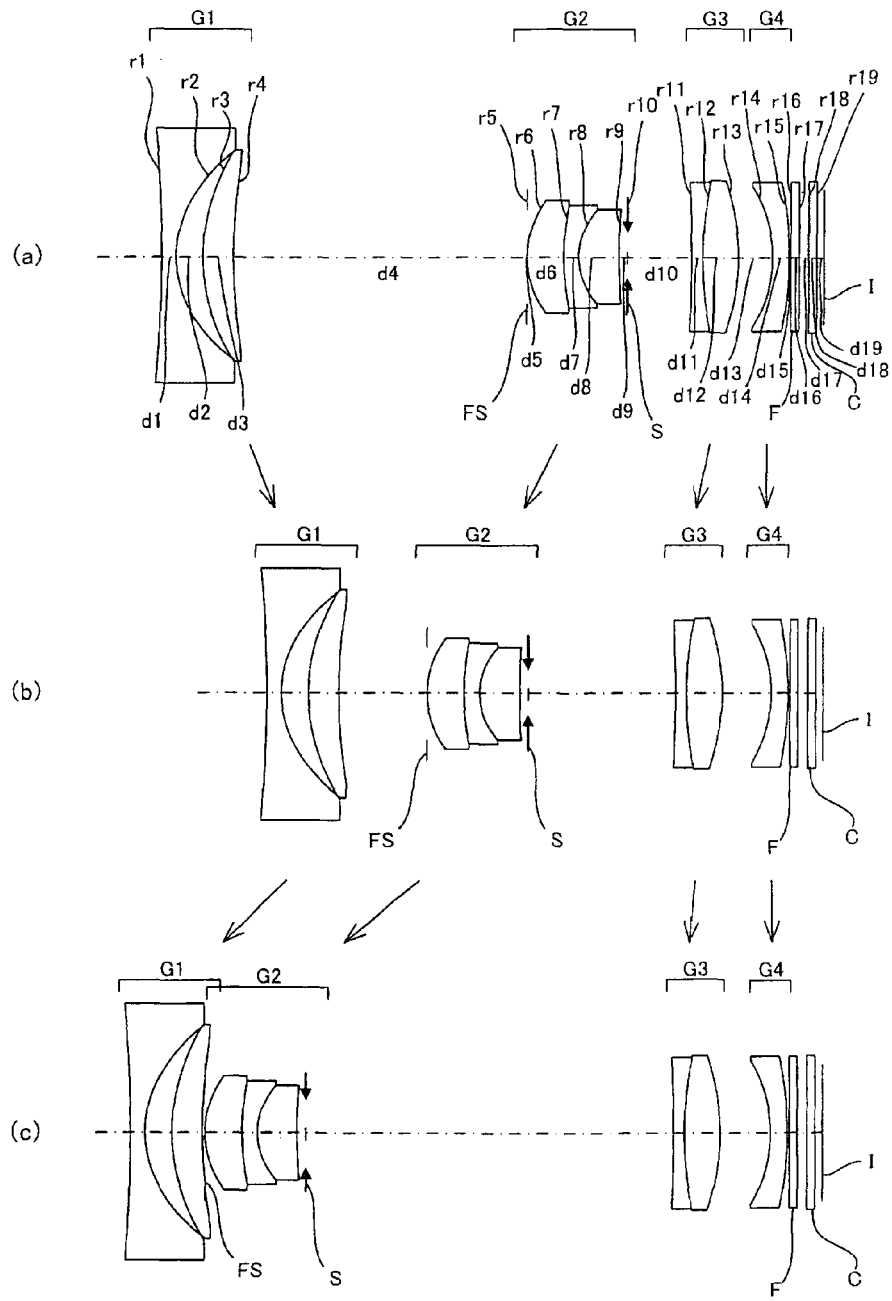
FIGS. 3A through 3C are cross-sectional views of Example 3 similar to FIGS. 1A through 1C.
Figure 4:
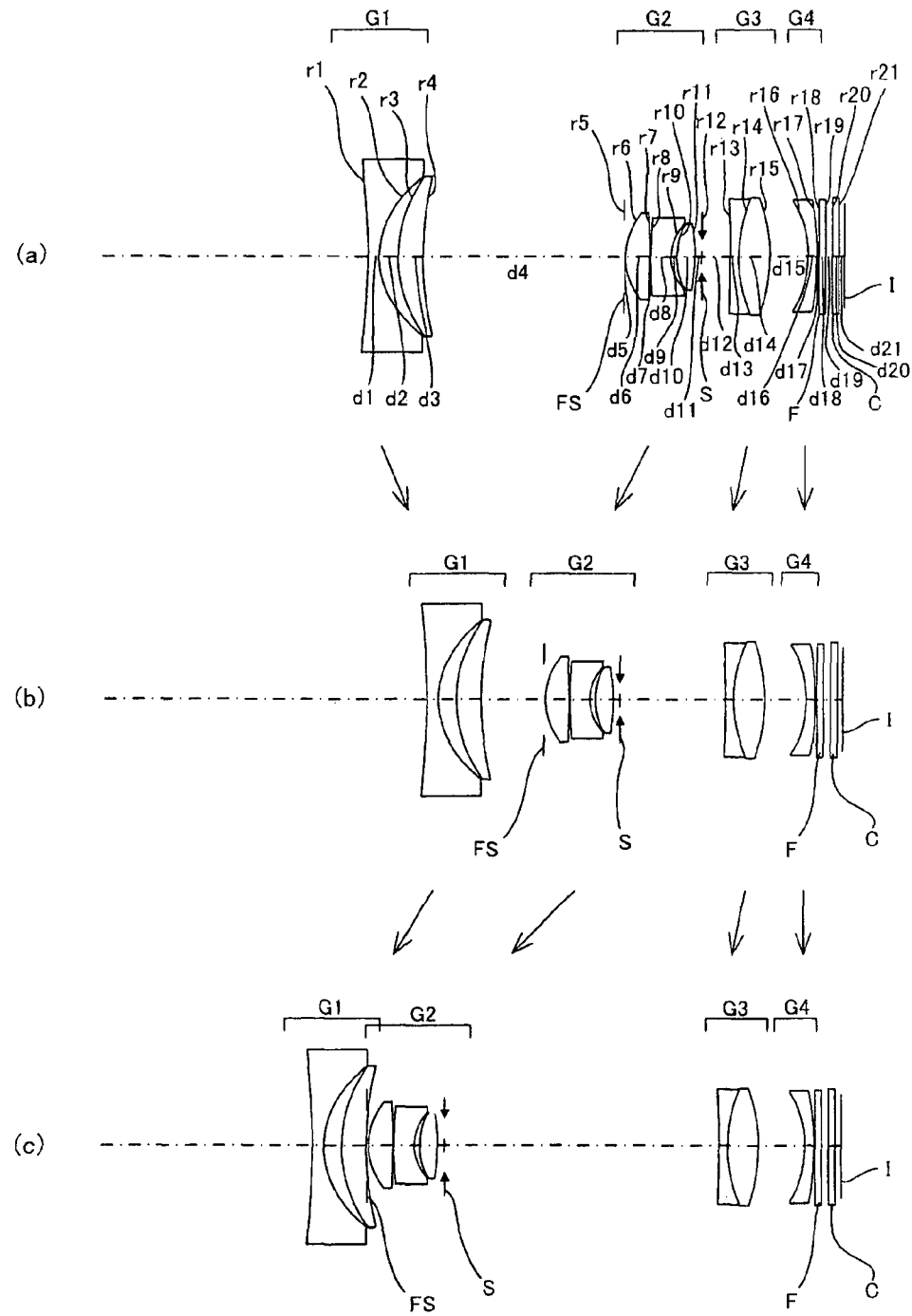
FIGS. 4A through 4C are cross-sectional views of Example 4 similar to FIGS. 1A through 1C.
Figure 5:
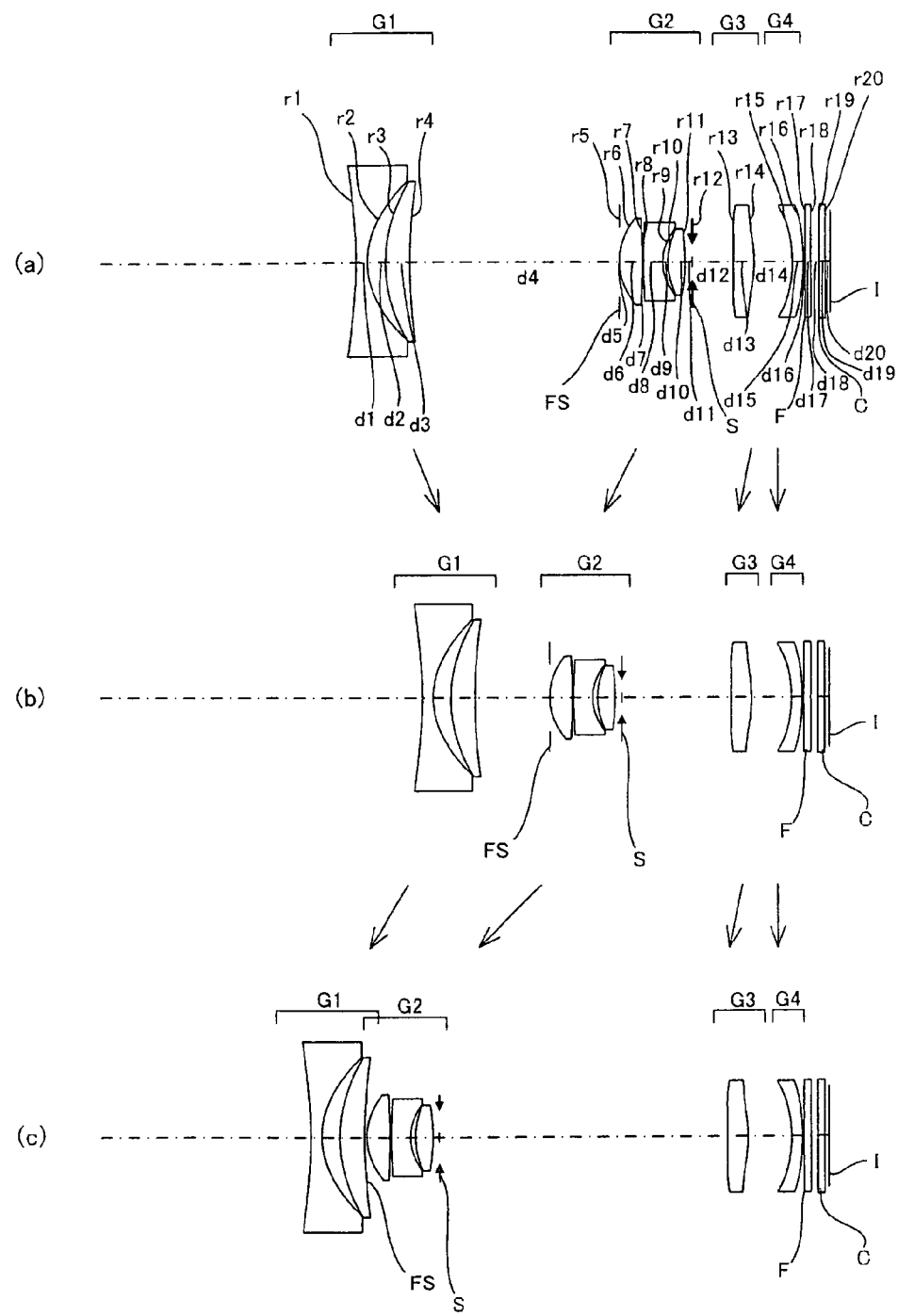
FIGS. 5A through 5C are cross-sectional views of Example 5 similar to FIGS. 1A through 1C.
Figure 6:
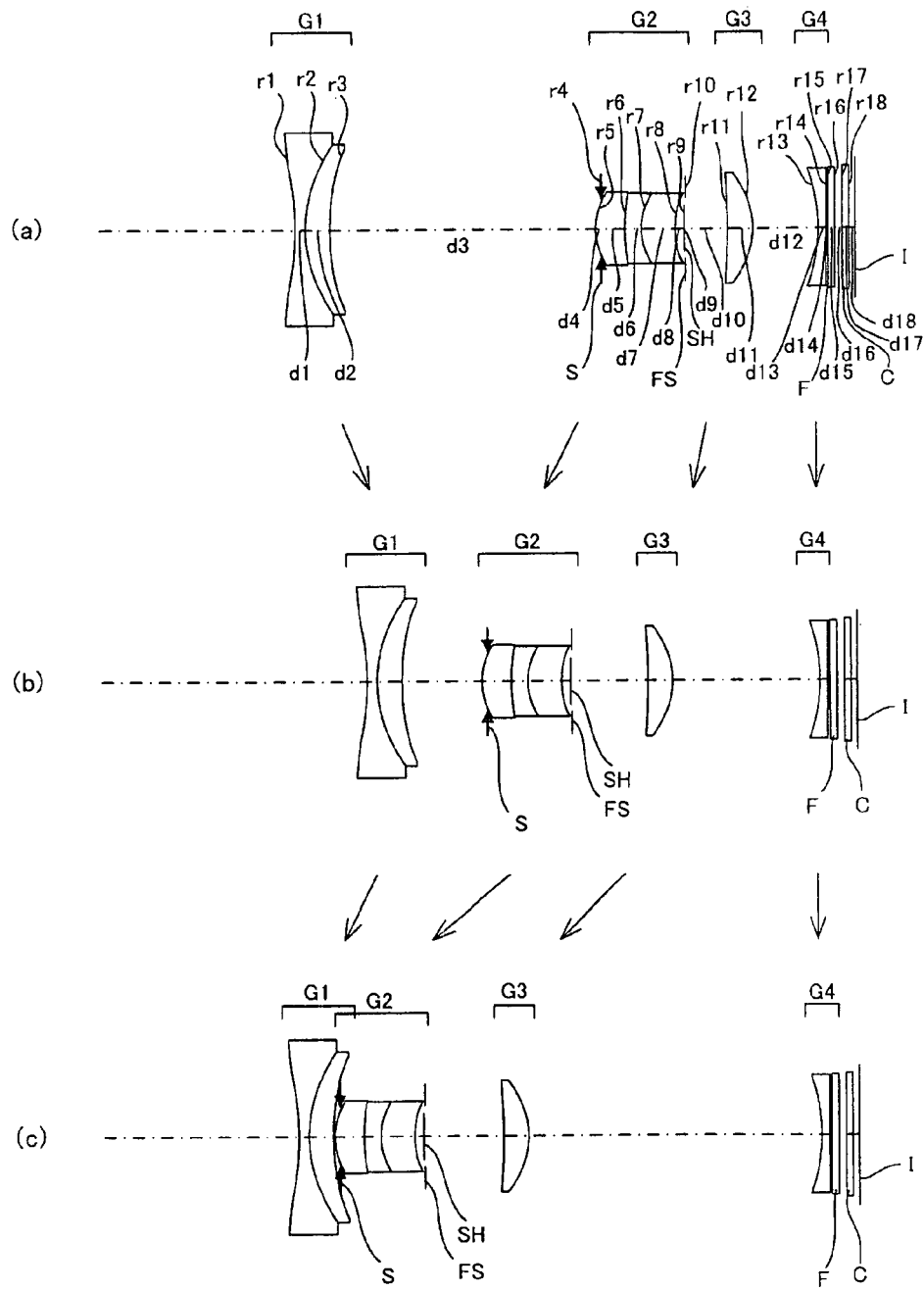
FIGS. 6A through 6C are cross-sectional views of Example 6 similar to FIGS. 1A through 1C.
Figure 7:
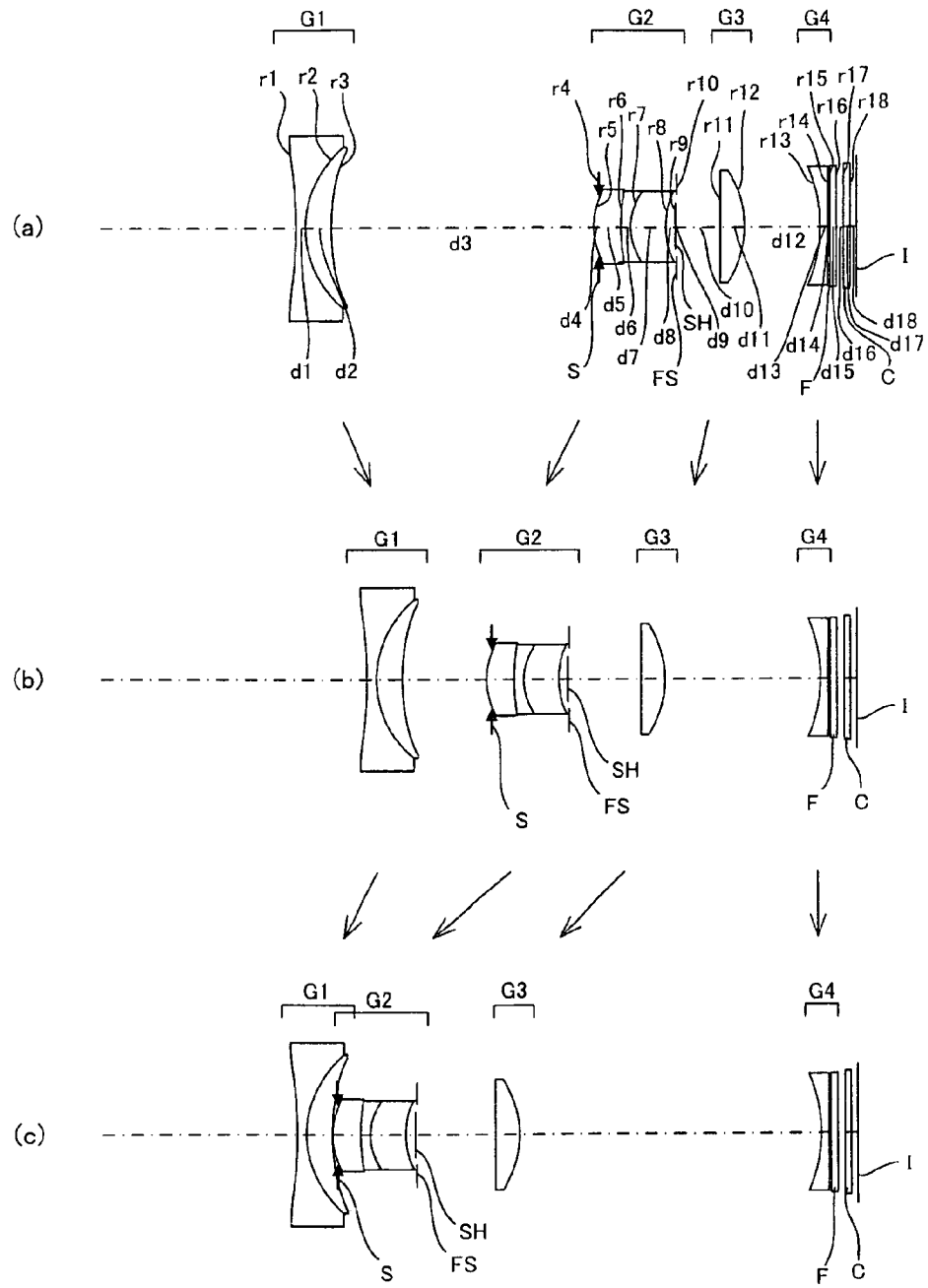
FIGS. 7A through 7C are cross-sectional views of Example 7 similar to FIGS. 1A through 1C.
Figure 8:
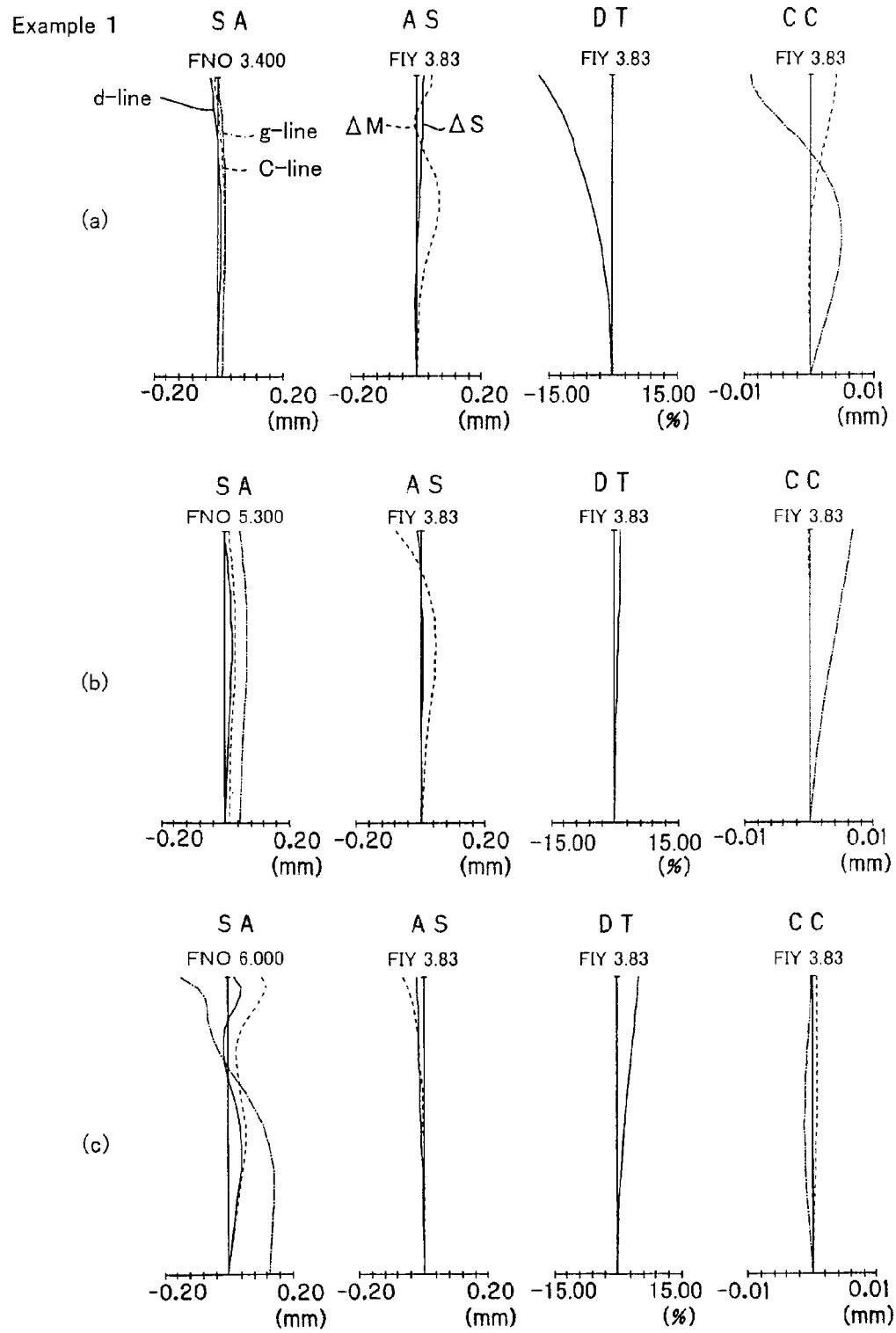
FIGS. 8A through 8C are illustrations of aberrations of Example 1 when focused at an object at infinity.
Figure 9:
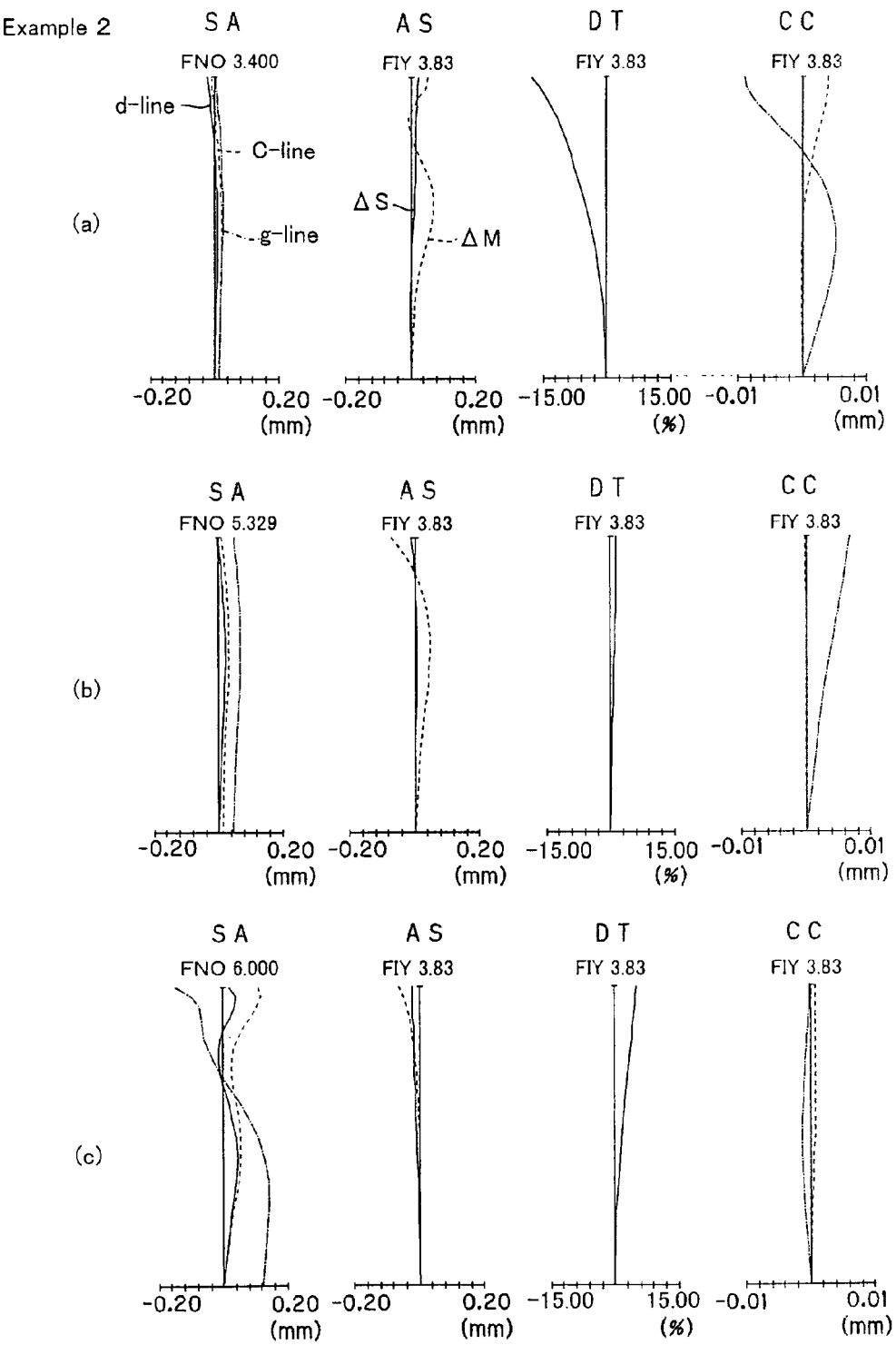
FIGS. 9A through 9C are illustrations of aberrations of Example 2 when focused at an object at infinity.
Figure 10:
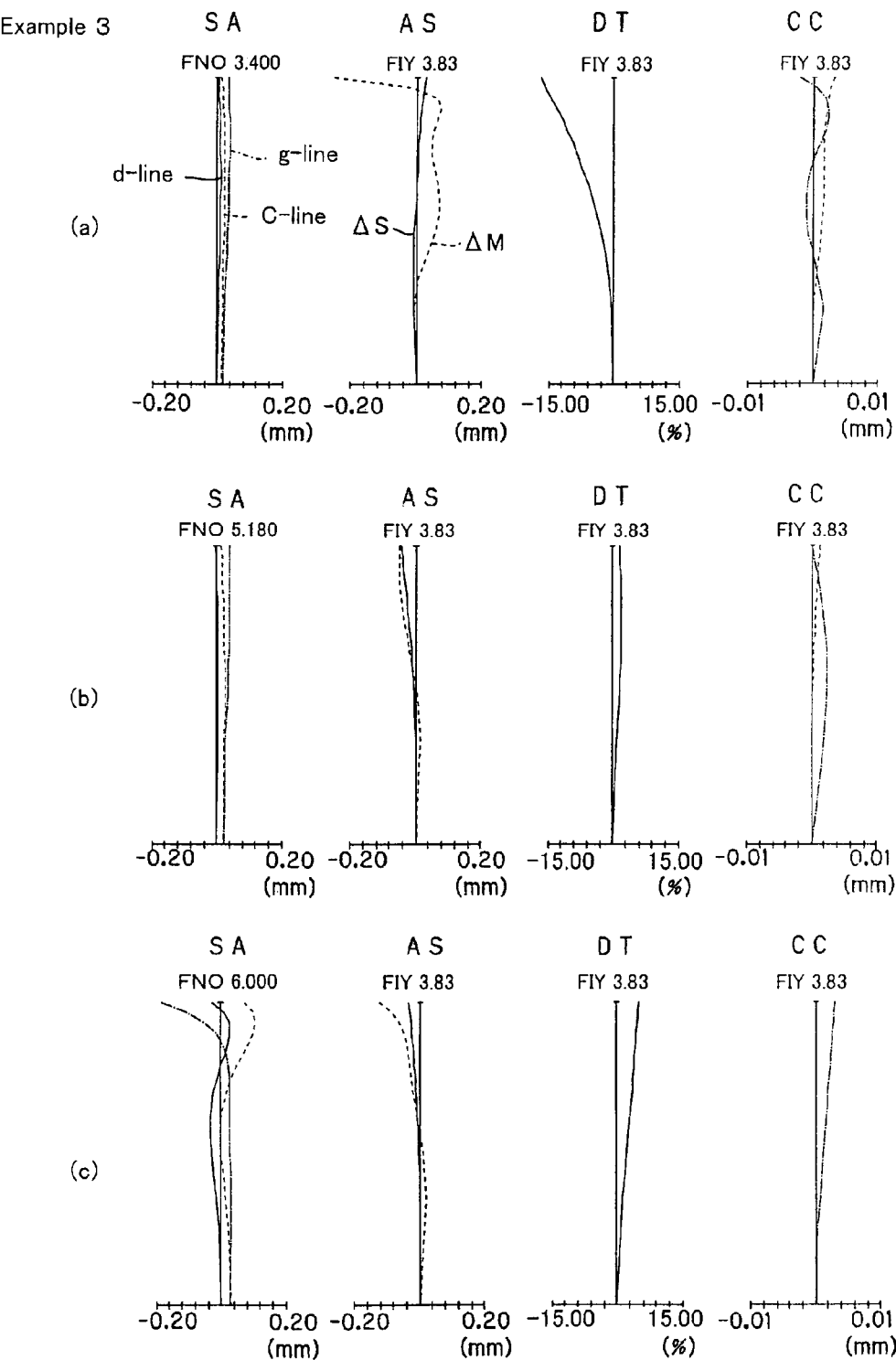
FIGS. 10A through 10C are illustrations of aberrations of Example 3 when focused at an object at infinity.
Figure 11:
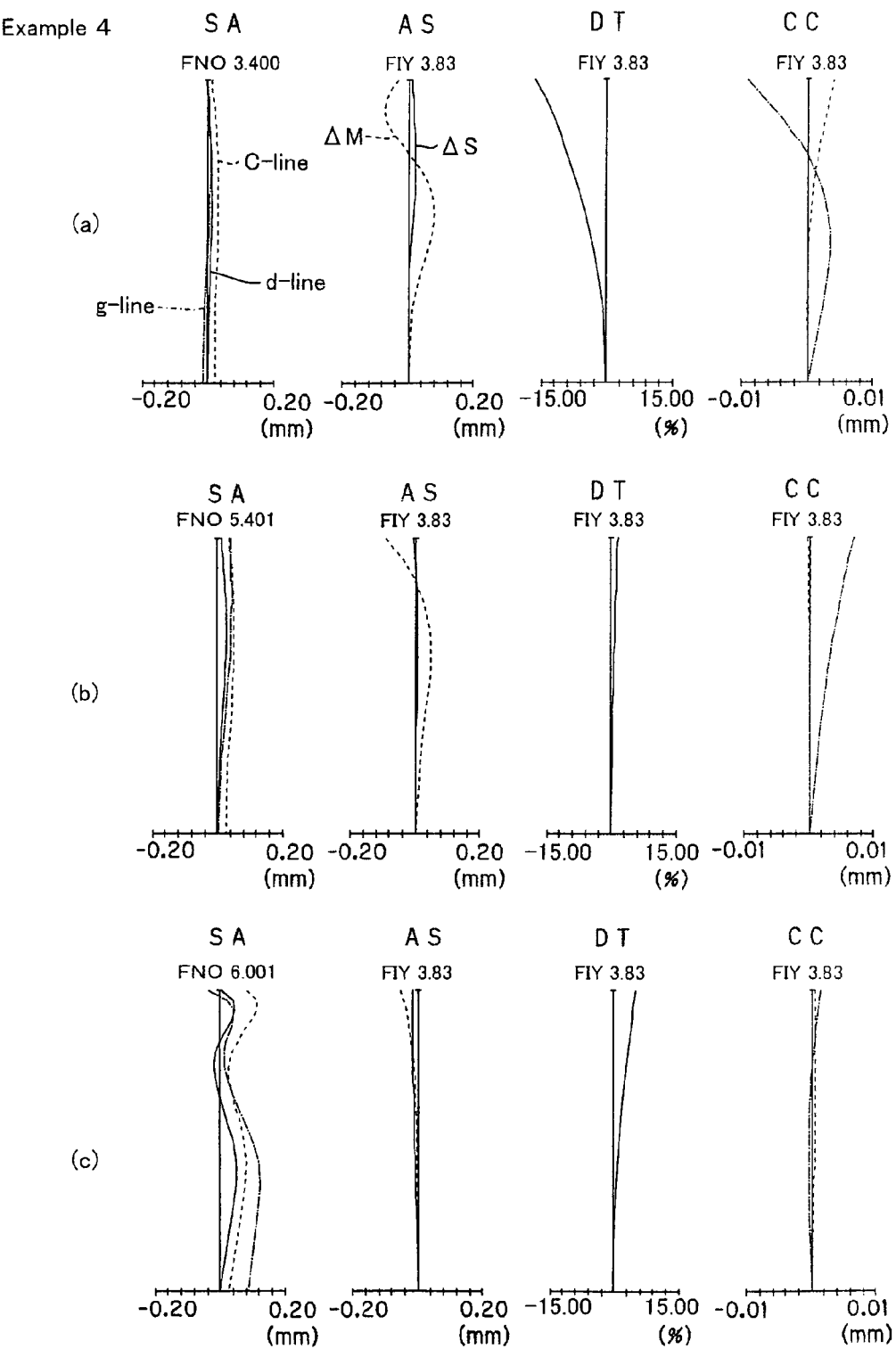
FIGS. 11A through 11C are illustrations of aberrations of Example 4 when focused at an object at infinity.
Figure 12:
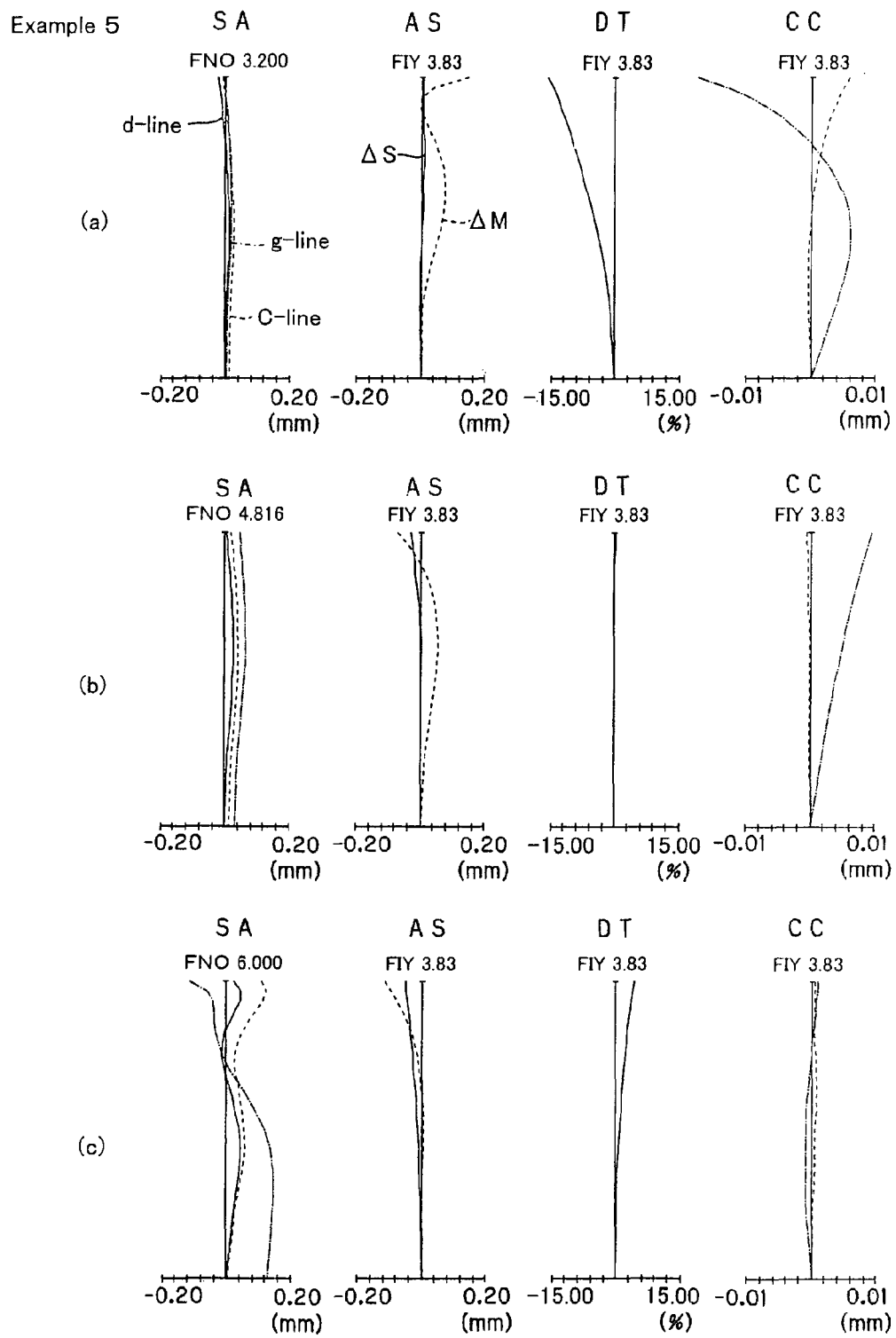
FIGS. 12A through 12C are illustrations of aberrations of Example 5 when focused at an object at infinity.
Figure 13:
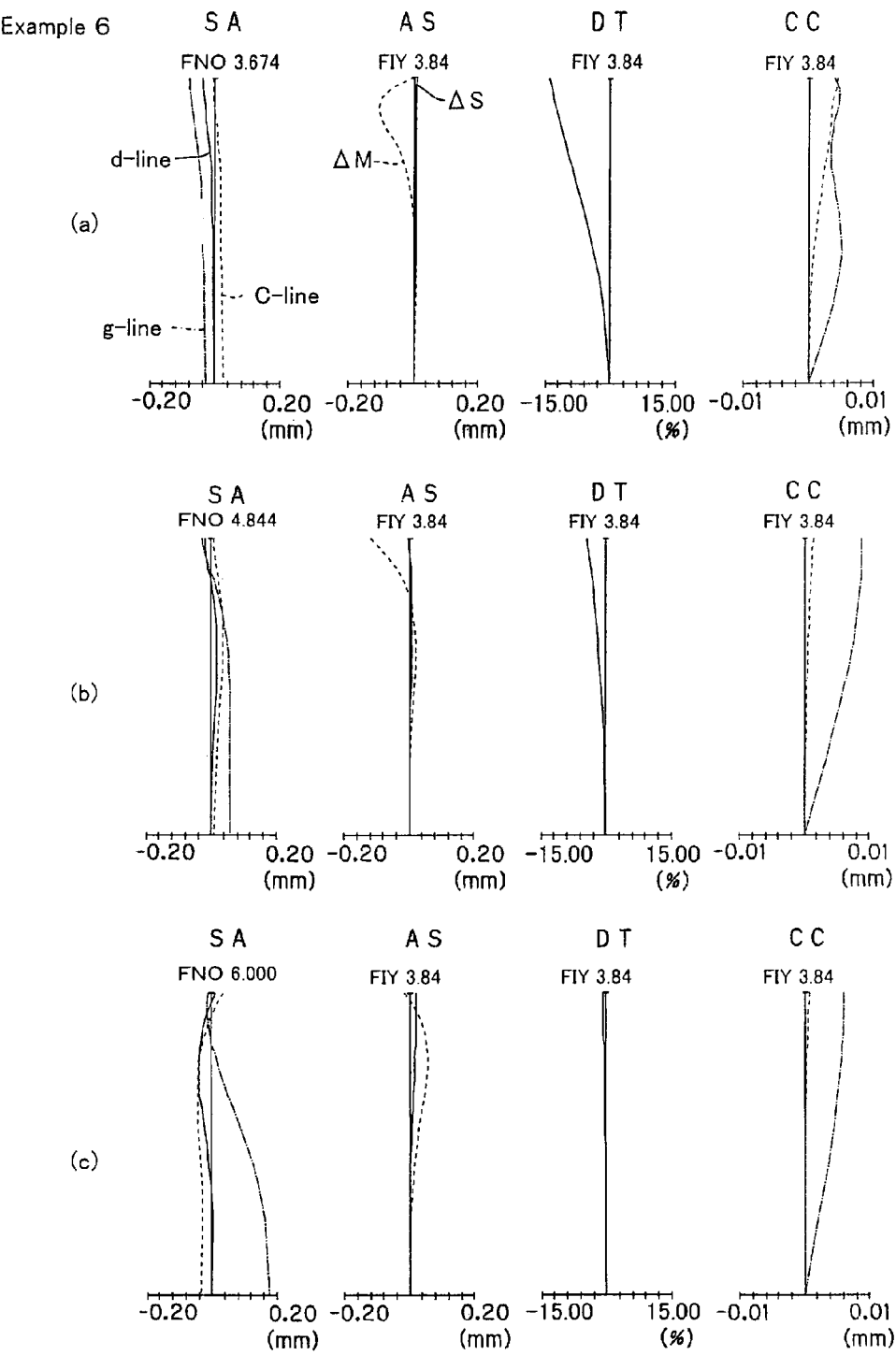
FIGS. 13A through 13C are illustrations of aberrations of Example 6 when focused at an object at infinity.
Figure 14:
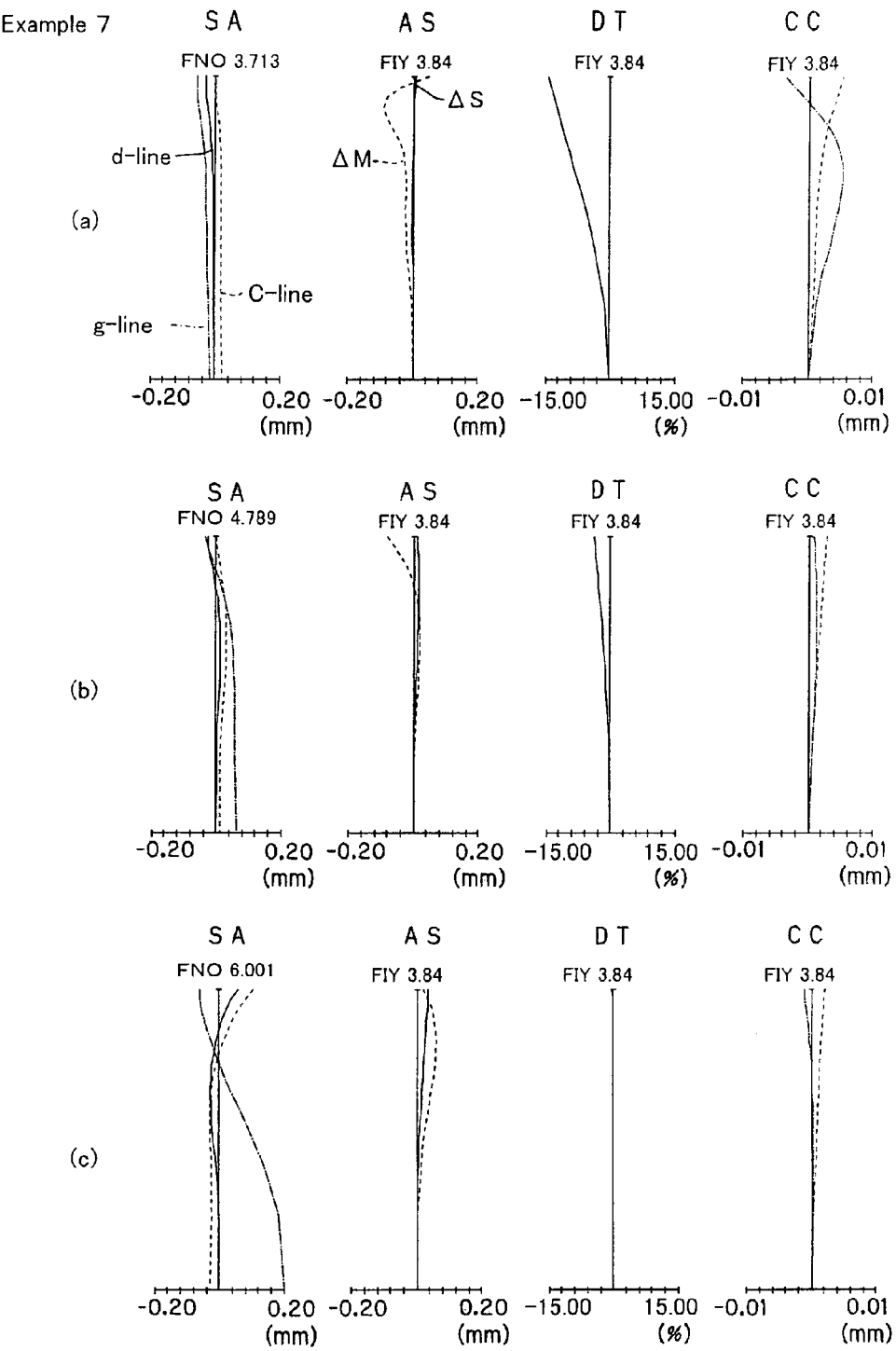
FIGS. 14A through 14C are illustrations of aberrations of Example 7 when focused at an object at infinity.

Each of the embodiments of the present invention that are described below provides a zoom lens devised in the above-described manner to make it compact but advantageous for realizing a wide angle of view and/or a high variable power ratio.

When each of the examples of zoom lenses that are described below is used as photographing lens in a compact digital camera, it is possible to reduce the thickness of the digital camera between the front end and the back end of the camera and realize a wide angle of view and/or a high variable power ratio to make it perform optically excellently.

Each of the examples that are described below is an exemplary image pickup apparatus having a zoom lens of the type that forwardly comes out when the image pickup apparatus is energized. Each of Examples 1 through 7 includes a very compact zoom lens that shows an excellent optical performance. The effective imaging region is a rectangle obtained in a fully zoomed state for each of Examples 1 through 7. The values that correspond to the conditional formulas of each of Examples 1 through 7 are those obtained when focused at an object at infinity. The total length represents the value obtained by adding the back focus distance BF to the distance from the light entering surface to the light exiting surface of the lens. The back focus distance BF is a value expressed as the length in air.

Now, the method of driving the zoom lens for zooming from the wide angle end to the telescopic end of each of the examples will be described below. The first lens group is driven to move toward the image side and subsequently toward the object side. The second lens group is driven to move only toward the object side. The third lens group is driven to move only toward the object side but any method may be used. The fourth lens group is fixed. A nearby object can be focused by driving the third lens group toward the object side.

Now, the zoom lens of each of Examples 1 through 7 will be described below. FIGS. 1A through 7C illustrate the zoom lenses of Examples 1 through 7 when focused at an object at infinity. Of these drawings, A is a cross-sectional view at the wide angle end and B is a cross-sectional view in an intermediate state, while C is a cross-sectional view at the telescopic end.

In the drawings, the first lens group is denoted by G1, the flare stop is denoted by FS, the second lens group is denoted by G2, the aperture stop is denoted by S, the third lens group is denoted by G3, the fourth lens group is denoted by G4, the optical low pass filter with IR cut coating is denoted by F, the cover glass of the CCD which is an electronic image pickup element is denoted by C, and the imaging surface of the CCD is denoted by I. The IR cut coating may be formed directly on the optical low pass filter F or a separate IR cut absorption filter may be arranged. For Examples 6 and 7, the position of arrangement of the shutter that is arranged immediately behind the second lens group at the image side is denoted by SH.

As shown in FIGS. 1A through 1C, the zoom lens of Example 1 is formed by arranging a first lens group G1 of negative refractive power, a second lens group G2 of positive refractive power, an aperture stop S, a third lens group G3 of positive refractive power and a fourth lens group G4 of negative refractive power sequentially from the object side.

How they are driven to move from the wide angle end to the telescopic end for varying the power of the zoom lens will be described below.

The first lens group G1 is driven to move from the wide angle end toward the image side to get to an intermediate state and then from the intermediate state toward the object side to get to the telescopic end. It is located at a position close to the object side at the telescopic end if compared with its position at the wide angle end.

The second lens group G2 and the aperture stop S are then driven to move integrally toward the object side from the wide angle end to the telescopic end, reducing the gap separating them from the first lens group G1 and increasing the gap separating them from the third lens group G3.

The third lens group G3 is driven to move toward the object side from the wide angle end to the telescopic end, increasing the gap separating it from the second lens group G2 and also increasing the gap separating it from the fourth lens group G4.

The fourth lens group G4 is fixed.

The first lens group G1 is formed by sequentially arranging a biconcave negative lens and a positive meniscus lens having a convex surface directed to the object side from the object side. The second lens group G2 is formed by sequentially arranging a biconvex positive lens, a negative meniscus lens having a convex surface directed to the object side, a biconvex positive lens and an aperture stop S. The third lens group G3 is formed by a cemented lens of a biconcave negative lens and a biconvex positive lens. The fourth lens group G4 is formed by a single negative meniscus lens having a convex surface directed to the image side.

Seven lens surfaces including the opposite surfaces of the biconcave negative lens of the first lens group G1, the opposite surfaces of the biconvex positive lens of the second lens group G2 arranged at the object side, the surface of the cemented lens of the third lens group G3 located at the image side extremity and the opposite surfaces of the negative meniscus lens of the fourth lens group G4 are aspheric.

As shown in FIGS. 2A through 2C, the zoom lens of Example 2 is formed by arranging a first lens group G1 of negative refractive power, a second lens group G2 of positive refractive power, an aperture stop S, a third lens group G3 of positive refractive power and a fourth lens group G4 of negative refractive power sequentially from the object side.

How they are driven to move from the wide angle end to the telescopic end for varying the power of the zoom lens will be described below.

The first lens group G1 is driven to move from the wide angle end toward the image side to get to an intermediate state and then from the intermediate state toward the object side to get to the telescopic end. It is located at a position close to the object side at the telescopic end if compared with its position at the wide angle end.

The second lens group G1 and the aperture stop S are then driven to move integrally toward the object side from the wide angle end to the telescopic end, reducing the gap separating them from the first lens group G1 and increasing the gap separating them from the third lens group G3.

The third lens group G3 is driven to move toward the object side from the wide angle end to the telescopic end, increasing the gap separating it from the second lens group G2 and also increasing the gap separating it from the fourth lens group G4.

The fourth lens group G4 is fixed.

The first lens group G1 is formed by sequentially arranging a biconcave negative lens and a positive meniscus lens having a convex surface directed to the object side from the object side. The second lens group G2 is formed by sequentially arranging a biconvex positive lens, a negative meniscus lens having a convex surface directed to the object side, a biconvex positive lens and an aperture stop S. The third lens group G3 is formed by a cemented lens of a biconcave negative lens and a biconvex positive lens. The fourth lens group G4 is formed by a single negative meniscus lens having a convex surface directed to the image side.

Seven lens surfaces including the opposite surfaces of the biconcave negative lens of the first lens group G1, the opposite surfaces of the biconvex positive lens of the second lens group G2 arranged at the object side, the surface of the cemented lens of the third lens group G3 located at the image side extremity and the opposite surfaces of the negative meniscus lens of the fourth lens group G4 are aspheric.

As shown in FIGS. 3A through 3C, the zoom lens of Example 3 is formed by arranging a first lens group G1 of negative refractive power, a second lens group G2 of positive refractive power, an aperture stop S, a third lens group G3 of positive refractive power and a fourth lens group G4 of negative refractive power sequentially from the object side.

How they are driven to move from the wide angle end to the telescopic end for varying the power of the zoom lens will be described below.

The first lens group G1 is driven to move from the wide angle end toward the image side to get to an intermediate state and then from the intermediate state toward the object side to get to the telescopic end. It is located at a position close to the object side at the telescopic end if compared with its position at the wide angle end.

The second lens group G2 and the aperture stop S are then driven to move integrally toward the object side from the wide angle end to the telescopic end, reducing the gap separating them from the first lens group G1 and increasing the gap separating them from the third lens group G3.

The third lens group G3 is driven to move toward the object side from the wide angle end to the telescopic end, increasing the gap separating it from the second lens group G2 and also increasing the gap separating it from the fourth lens group G4.

The fourth lens group G4 is fixed.

The first lens group G1 is formed by sequentially arranging a biconcave negative lens and a positive meniscus lens having a convex surface directed to the object side from the object side. The second lens group G2 is formed by a cemented lens of a positive meniscus lens having a convex surface directed to the object side, a negative meniscus lens having a convex surface directed to the object side and a biconvex positive lens and an aperture stop S. The third lens group G3 is formed by a cemented lens of a biconcave negative lens and a biconvex positive lens. The fourth lens group G4 is formed by a single negative meniscus lens having a convex surface directed to the image side.

Eight lens surfaces including the opposite surfaces of the biconcave negative lens and the opposite surfaces of the positive meniscus lens of the first lens group G1, the surface at the object side extremity and the surface at the image side extremity of the cemented lens of the second lens group G2 and the opposite surfaces of the negative meniscus lens of the fourth lens group G4 are aspheric.

As shown in FIGS. 4A through 4C, the zoom lens of Example 4 is formed by arranging a first lens group G1 of negative refractive power, a second lens group G2 of positive refractive power, an aperture stop S, a third lens group G3 of positive refractive power and a fourth lens group G4 of negative refractive power sequentially from the object side.

How they are driven to move from the wide angle end to the telescopic end for varying the power of the zoom lens will be described below.

The first lens group G1 is driven to move from the wide angle end toward the image side to get to an intermediate state and then from the intermediate state toward the object side to get to the telescopic end. It is located at a position close to the object side at the telescopic end if compared with its position at the wide angle end.

The second lens group G1 and the aperture stop S are then driven to move integrally toward the object side from the wide angle end to the telescopic end, reducing the gap separating them from the first lens group G1 and increasing the gap separating them from the third lens group G3.

The third lens group G3 is driven to move toward the object side from the wide angle end to the telescopic end, increasing the gap separating it from the second lens group G2 and also increasing the gap separating it from the fourth lens group G4.

The fourth lens group G4 is fixed.

The first lens group G1 is formed by sequentially arranging a biconcave negative lens and a positive meniscus lens having a convex surface directed to the object side from the object side. The second lens group G2 is formed by a biconcave positive lens, a negative meniscus lens having a convex surface directed to the object side, a biconvex positive lens and an aperture stop S. The third lens group G3 is formed by a cemented lens of a biconcave negative lens and a biconvex positive lens. The fourth lens group G4 is formed by a single negative meniscus lens having a convex surface directed to the image side.

Eight lens surfaces including the opposite surfaces of the biconcave negative lens of the first lens group G1, the opposite surfaces of the object side biconvex positive lens and the opposite surfaces of the image side biconvex positive lens of the second lens group G2 and the opposite surfaces of the negative meniscus lens of the fourth lens group G4 are aspheric.

As shown in FIGS. 5A through 5C, the zoom lens of Example 5 is formed by arranging a first lens group G1 of negative refractive power, a second lens group G2 of positive refractive power, an aperture stop S, a third lens group G3 of positive refractive power and a fourth lens group G4 of negative refractive power sequentially from the object side.

How they are driven to move from the wide angle end to the telescopic end for varying the power of the zoom lens will be described below.

The first lens group G1 is driven to move from the wide angle end toward the image side to get to an intermediate state and then from the intermediate state toward the object side to get to the telescopic end. It is located at a position close to the object side at the telescopic end if compared with its position at the wide angle end.

The second lens group G2 and the aperture stop S are then driven to move integrally toward the object side from the wide angle end to the telescopic end, reducing the gap separating them from the first lens group G1 and increasing the gap separating them from the third lens group G3.

The third lens group G3 is driven to move toward the object side from the wide angle end to the telescopic end, increasing the gap separating it from the second lens group G2 and also increasing the gap separating it from the fourth lens group G4.

The fourth lens group G4 is fixed.

The first lens group G1 is formed by sequentially arranging a biconcave negative lens and a positive meniscus lens having a convex surface directed to the object side from the object side. The second lens group G2 is formed by a biconvex positive lens, a negative meniscus lens having a convex surface directed to the object side, a biconvex positive lens and an aperture stop S. The third lens group G3 is formed by a single positive meniscus lens having a convex surface directed to the image side. The fourth lens group G4 is formed by a single negative meniscus lens having a convex surface directed to the image side.

Eight lens surfaces including the opposite surfaces of the biconcave negative lens of the first lens group G1, the opposite surfaces of the biconvex positive lens of the second lens group G2, the opposite surfaces of the positive meniscus lens of the third lens group G3 and the opposite surfaces of the negative meniscus lens of the fourth lens group G4 are aspheric.

As shown in FIGS. 6A through 6C, the zoom lens of Example 6 is formed by sequentially arranging a first lens group G1 of negative refractive power, an aperture stop S, a second lens group G2 of positive refractive power, a shutter SH, a flare stop FS, a third lens group G3 of positive refractive power and a fourth lens group G4 of negative refractive power from the object side.

How they are driven to move from the wide angle end to the telescopic end for varying the power of the zoom lens will be described below.

The first lens group G1 is driven to move from the wide angle end toward the image side to get to an intermediate state and then from the intermediate state toward the object side to get to the telescopic end. Both the telescopic end and the wide angle end are substantially at the same position.

The aperture stop S, the second lens group G2, the shutter SH and the flare stop FS are driven to move integrally toward the object side from the wide angle end to the telescopic end, reducing the gap separating them from the first lens group G1 and increasing the gap separating them from the third lens group G3.

The third lens group G3 is driven to move toward the object side from the wide angle end to the telescopic end, increasing the gap separating it from the second lens group G2 and also increasing the gap separating it from the fourth lens group G4.

The fourth lens group G4 is fixed.

The first lens group G1 is formed by arranging a biconcave negative lens and a positive meniscus lens having a convex surface directed to the object side sequentially from the object side. The second lens group G2 is formed by an aperture stop S, a cemented lens of a positive meniscus lens having a convex surface directed to the object side, a negative meniscus lens having a convex surface directed to the object side and a positive meniscus lens having a convex surface directed to the object side, a shutter SH and a flare stop FS. The third lens group G3 is formed by a single positive meniscus lens having a convex surface directed to the image side. The fourth lens group G4 is formed by a single negative plano-concave lens having a concave surface directed to the object side.

Six lens surfaces including the object side surface, the cemented surface and the image side surface of the cemented lens of the first lens group G1, the object side surface and the image side surface of the cemented lens of the second lens group G2 and the object side surface of the positive meniscus lens of the third lens group G3 are aspheric.

As shown in FIGS. 7A through 7C, the zoom lens of Example 7 is formed by sequentially arranging a first lens group G1 of negative refractive power, an aperture stop S, a second lens group G2 of positive refractive power, a shutter SH, a flare stop FS, a third lens group G3 of positive refractive power and a fourth lens group G4 of negative refractive power from the object side.

How they are driven to move from the wide angle end to the telescopic end for varying the power of the zoom lens will be described below.

The first lens group G1 is driven to move from the wide angle end toward the image side to get to an intermediate state and then from the intermediate state toward the object side to get to the telescopic end. Both the telescopic end and the wide angle end are substantially at a same position.

The aperture stop S, the second lens group G2, the shutter SH and the flare stop FS are driven to move integrally toward the object side from the wide angle end to the telescopic end, reducing the gap separating them from the first lens group G1 and increasing the gap separating them from the third lens group G3.

The third lens group G3 is driven to move toward the object side from the wide angle end to the telescopic end, increasing the gap separating it from the second lens group G2 and also increasing the gap separating it from the fourth lens group G4.

The fourth lens group G4 is fixed.

The first lens group G1 is formed by a cemented lens of a biconcave negative lens and a positive meniscus lens having a convex surface directed to the object side that are arranged sequentially from the object side. The second lens group G2 is formed by an aperture stop S, a cemented lens of a positive meniscus lens having a convex surface directed to the object side, a negative meniscus lens having a convex surface directed to the object side and a positive meniscus lens having a convex surface directed to the object side, a shutter SH and a flare stop FS. The third lens group G3 is formed by a single positive meniscus lens having a convex surface directed to the image side. The fourth lens group G4 is formed by a single negative meniscus lens having a concave surface directed to the object side.

Five lens surfaces including the object side surface and the image side surface of the cemented lens of the first lens group G1, the object side surface and the image side surface of the cemented lens of the second lens group G2 and the object side surface of the positive meniscus lens of the third lens group G3 are aspheric.

Some of the numerical data of the lenses of each of the examples are listed below.

In the numerical data of the lenses of the examples, r denotes the radius of curvature of each lens surface, d denotes the thickness or the gap between the opposite surfaces of each lens, nd denotes the refractive index of each lens at d line, vd denotes the Abbe number of each lens at d line, K denotes the conic coefficient, A4, A6, A8 and A10 denote the aspheric coefficient and E±N denotes ×10$^{±N}$. The values of the image height at the wide angle end and the angle of view are those obtained when the distortion is not electrically corrected. When the distortion is electrically corrected, the image height and the angle of view at the wide angle end are altered because the barrel-shaped aberration that takes place at the wide angle end is electrically corrected.

Each aspheric profile is expressed by the formula shown below, using the aspheric coefficients of each embodiment.

$$Z=(Y^2/r)/[1+\{1-(1+K)\cdot(Y/r)^2\}^{1/2}]+A4\times Y^4+A6\times Y^6+A8\times Y^8+A10\times Y^{10},$$

where Z is the coordinate in the direction of the optical axis and Y is the coordinate in a direction perpendicular to the optical axis.

NUMERICAL VALUES OF EXAMPLE 1

| unit mm | | | | |
|---|---|---|---|---|
| Surface data | | | | |
| surface No. | r | d | nd | vd |
| 1 (aspheric) | −25.246 | 0.85 | 1.85135 | 40.10 |
| 2 (aspheric) | 6.661 | 1.30 | | |
| 3 | 11.588 | 1.80 | 2.00180 | 19.30 |
| 4 | 43.650 | variable | | |
| 5 (flare stop) | ∞ | 0.00 | | |
| 6 (aspheric) | 4.807 | 1.80 | 1.85135 | 40.10 |
| 7 (aspheric) | −74.147 | 0.10 | | |
| 8 | 41.412 | 1.40 | 2.00069 | 25.46 |
| 9 | 3.802 | 0.40 | | |
| 10 | 5.783 | 1.30 | 1.49700 | 81.54 |
| 11 | −17.482 | 0.50 | | |
| 12 (diaphragm) | ∞ | variable | | |
| 13 | −120.630 | 0.60 | 1.86400 | 40.58 |
| 14 | 11.000 | 2.30 | 1.73077 | 40.50 |
| 15 (aspheric) | −10.840 | variable | | |
| 16 (aspheric) | −9.800 | 0.85 | 1.52540 | 56.00 |
| 17 (aspheric) | −29.256 | 0.10 | | |

-continued unit mm

| | | | | |
|---|---|---|---|---|
| 18 | ∞ | 0.50 | 1.51633 | 64.14 |
| 19 | ∞ | 0.50 | | |
| 20 | ∞ | 0.50 | 1.51633 | 64.14 |
| 21 | ∞ | 0.37 | | |
| image plane | ∞ | | | |

Aspheric data

1st surface

K = 0.000, A4 = 2.53566E−04, A6 = −2.07621E−06,
A8 = −3.88389E−09
2nd surface

K = −0.546, A4 = −1.13683E−05, A6 = 5.74739E−06,
A8 = −1.99026E−07
6th surface

K = 0.000, A4 = −5.56687E−04, A6 = 6.21295E−06,
A8 = −2.89537E−06
7th surface

K = 0.000, A4 = 2.81306E−04, A6 = 2.83352E−06,
A8 = −1.94223E−06
15th surface

K = 0.000, A4 = 1.50000E−04, A6 = −3.00000E−06
16th surface

K = 0.000, A4 = −3.34054E−04, A6 = −4.65676E−05
17th surface

K = 0.000, A4 = 5.61769E−04, A6 = −6.17268E−05

Zooming data

| | wide angle | intermediate | telescopic |
|---|---|---|---|
| focal length | 4.80 | 10.50 | 23.06 |
| F number | 3.40 | 5.30 | 6.00 |
| angle of view | 88.04 | 39.64 | 17.98 |
| image height | 3.83 | 3.83 | 3.83 |
| d4 | 15.96 | 5.13 | 0.15 |
| d12 | 2.19 | 7.66 | 19.97 |
| d15 | 2.82 | 2.93 | 3.20 |
| BF | 1.63 | 1.63 | 1.63 |
| lens total length | 35.81 | 30.55 | 38.16 |

Zoom lens group data

| group | starting surface | focal length |
|---|---|---|
| 1 | 1 | −11.53 |
| 2 | 6 | 9.65 |
| 3 | 11 | 20.00 |
| 4 | 14 | −28.48 |

NUMERICAL VALUES OF EXAMPLE 2 unit mm

Surface data

| surface No. | r | d | nd | vd |
|---|---|---|---|---|
| 1 (aspheric) | −26.034 | 0.85 | 1.85135 | 40.10 |
| 2 (aspheric) | 6.583 | 1.30 | | |
| 3 | 11.529 | 1.80 | 2.00180 | 19.30 |
| 4 | 43.415 | variable | | |
| 5 (flare stop) | ∞ | 0.00 | | |

-continued unit mm

| | | | | |
|---|---|---|---|---|
| 6 (aspheric) | 4.798 | 1.80 | 1.85135 | 40.10 |
| 7 (aspheric) | −73.591 | 0.10 | | |
| 8 | 42.296 | 1.40 | 2.00069 | 25.46 |
| 9 | 3.797 | 0.40 | | |
| 10 | 5.771 | 1.30 | 1.49700 | 81.54 |
| 11 | −17.361 | 0.50 | | |
| 12 (diaphragm) | ∞ | variable | | |
| 13 | −179.881 | 0.60 | 1.88300 | 40.76 |
| 14 | 11.000 | 2.30 | 1.73077 | 40.50 |
| 15 (aspheric) | −10.908 | variable | | |
| 16 (aspheric) | −9.800 | 0.85 | 1.52540 | 56.00 |
| 17 (aspheric) | −30.533 | 0.10 | | |
| 18 | ∞ | 0.50 | 1.51633 | 64.14 |
| 19 | ∞ | 0.50 | | |
| 20 | ∞ | 0.50 | 1.51633 | 64.14 |
| 21 | ∞ | 0.37 | | |
| image plane | ∞ | | | |

Aspheric data

1st surface

K = 0.000, A4 = 2.29991E−04, A6 = −1.73683E−06,
A8 = −5.74375E−09
2nd surface

K = −0.636, A4 = −1.03611E−06, A6 = 6.07445E−06,
A8 = −1.89803E−07
6th surface

K = 0.000, A4 = −5.56571E−04, A6 = 5.87494E−06,
A8 = −2.89756E−06
7th surface

K = 0.000, A4 = 2.84429E−04, A6 = 2.16646E−06,
A8 = −1.89190E−06
15th surface

K = 0.000, A4 = 1.50000E−04, A6 = −3.00000E−06
16th surface

K = 0.000, A4 = −3.34054E−04, A6 = −4.65676E−05
17th surface

K = 0.000, A4 = 5.35476E−04, A6 = −6.21987E−05

Zooming data

| | wide angle | intermediate | telescopic |
|---|---|---|---|
| focal length | 4.80 | 10.60 | 23.06 |
| F number | 3.40 | 5.33 | 6.00 |
| angle of view | 88.06 | 39.28 | 17.99 |
| image height | 3.83 | 3.83 | 3.83 |
| d4 | 15.98 | 5.04 | 0.15 |
| d12 | 2.22 | 7.76 | 19.97 |
| d15 | 2.78 | 2.92 | 3.20 |
| BF | 1.63 | 1.63 | 1.63 |
| lens total length | 35.82 | 30.55 | 38.16 |

Zoom lens group data

| group | starting surface | focal length |
|---|---|---|
| 1 | 1 | −11.52 |
| 2 | 6 | 9.65 |
| 3 | 11 | 20.00 |
| 4 | 14 | −27.86 |

NUMERICAL VALUES OF EXAMPLE 3

| unit mm | | | | |
|---|---|---|---|---|
| Surface data | | | | |
| surface No. | r | d | nd | vd |
| 1 (aspheric) | −35.617 | 0.80 | 1.85135 | 40.10 |
| 2 (aspheric) | 6.301 | 1.48 | | |
| 3 (aspheric) | 9.610 | 1.71 | 2.00180 | 19.30 |
| 4 (aspheric) | 22.042 | variable | | |
| 5 (flare stop) | ∞ | 0.00 | | |
| 6 (aspheric) | 5.145 | 2.06 | 1.85135 | 40.10 |
| 7 | 14.031 | 0.87 | 2.00069 | 25.46 |
| 8 | 3.875 | 2.23 | 1.62263 | 58.16 |
| 9 (aspheric) | −105.851 | 0.50 | | |
| 10 (diaphragm) | ∞ | variable | | |
| 11 | −120.000 | 0.60 | 1.88300 | 40.76 |
| 12 | 20.665 | 2.00 | 1.78590 | 44.20 |
| 13 | −13.109 | variable | | |
| 14 (aspheric) | −9.800 | 0.90 | 1.52540 | 56.00 |
| 15 (aspheric) | −28.539 | 0.10 | | |
| 16 | ∞ | 0.50 | 1.51633 | 64.14 |
| 17 | ∞ | 0.50 | | |
| 18 | ∞ | 0.50 | 1.51633 | 64.14 |
| 19 | ∞ | 0.37 | | |
| image plane | ∞ | | | |

Aspheric data

1st surface

K = 0.000, A4 = 3.70142E−04, A6 = −5.24195E−06, A8 = 1.62108E−08

2nd surface

K = −2.323, A4 = 5.04960E−04, A6 = 3.38435E−05,
A8 = −8.47291E−07, A10 = 1.13025E−08, A12 = −1.90255E−10

3rd surface

K = −1.594, A4 = −5.99201E, A6 = 2.51390E−05, A8 = −2.31343E−07

4th surface

K = −1.903, A4 = −5.19246E−04, A6 = 1.32864E−05,
A8 = −1.75751E−07

6th surface

K = 0.000, A4 = −1.84377E−04, A6 = 5.16691E−06, A8 = 5.70849E−08

9th surface

K = 0.000, A4 = 1.82713E−03, A6 = 7.76894E−05, A8 = 1.45050E−05

14th surface

K = 0.000, A4 = −1.75207E−03, A6 = 6.55286E−05,
A8 = −6.75366E−06, A10 = 3.32586E−07

15th surface

K = 0.000, A4 = 1.00598E−03, A6 = −1.95585E−04, A8 = 6.91879E−06,
A10 = −7.38228E−09

| Zooming data | | | |
|---|---|---|---|
| | wide angle | intermediate | telescopic |
| focal length | 4.80 | 10.57 | 23.06 |
| F number | 3.40 | 5.18 | 6.00 |
| angle of view | 87.77 | 39.23 | 17.98 |
| image height | 3.83 | 3.83 | 3.83 |
| d4 | 16.26 | 4.88 | 0.15 |
| d10 | 3.56 | 8.19 | 20.43 |
| d13 | 1.91 | 2.72 | 2.81 |
| BF | 1.63 | 1.63 | 1.63 |
| lens total length | 36.51 | 30.56 | 38.16 |

| unit mm | | |
|---|---|---|
| Zoom lens group data | | |
| group | starting surface | focal length |
| 1 | 1 | −11.33 |
| 2 | 6 | 9.49 |
| 3 | 11 | 20.48 |
| 4 | 14 | −28.89 |

NUMERICAL VALUES OF EXAMPLE 4

| unit mm | | | | |
|---|---|---|---|---|
| surface data | | | | |
| surface No. | r | d | nd | vd |
| 1 (aspheric) | −30.761 | 0.85 | 1.85135 | 40.10 |
| 2 (aspheric) | 6.598 | 1.30 | | |
| 3 | 10.221 | 1.80 | 2.00180 | 19.30 |
| 4 | 24.961 | variable | | |
| 5 (flare stop) | ∞ | 0.00 | | |
| 6 (aspheric) | 4.803 | 1.80 | 1.85135 | 40.10 |
| 7 (aspheric) | −24.280 | 0.10 | | |
| 8 | 49.783 | 1.40 | 2.00069 | 25.46 |
| 9 | 3.452 | 0.40 | | |
| 10 (aspheric) | 6.315 | 1.30 | 1.52540 | 56.00 |
| 11 (aspheric) | −14.385 | 0.50 | | |
| 12 (diaphragm) | ∞ | variable | | |
| 13 | −100.000 | 0.60 | 1.88300 | 40.76 |
| 14 | 11.000 | 2.30 | 1.83481 | 42.71 |
| 15 | −13.460 | variable | | |
| 16 (aspheric) | −9.800 | 0.70 | 1.52540 | 56.00 |
| 17 (aspheric) | −22.932 | 0.10 | | |
| 18 | ∞ | 0.50 | 1.51633 | 64.14 |
| 19 | ∞ | 0.50 | | |
| 20 | ∞ | 0.50 | 1.51633 | 64.14 |
| 21 | ∞ | 0.37 | | |
| image plane | ∞ | | | |

Aspheric data

1st surface

K = −8.286, A4 = 2.70135E−04, A6 = −3.06139E−06,
A8 = 6.07043E−09

2nd surface

K = −0.520, A4 = 1.31960E−04, A6 = 8.17043E−06,
A8 = −2.42436E−07

6th surface

K = 0.000, A4 = −7.90621E−04, A6 = 1.36276E−05,
A8 = −7.01844E−08

7th surface

K = 0.000, A4 = 9.53540E−04, A6 = 4.69789E−05, A8 = −3.19366E−06

10th surface

K = 0.000, A4 = 2.94676E−03, A6 = 2.84517E−04, A8 = 2.20035E−05

11th surface

K = 0.000, A4 = 2.90009E−04, A6 = −5.95917E−05, A8 = 4.57609E−05

16th surface

K = 0.000, A4 = −1.17898E−03, A6 = 2.18877E−05

17th surface

K = 0.000, A4 = −7.51401E−05, A6 = 3.85010E−06

NUMERICAL VALUES OF EXAMPLE 5 unit mm

Zooming data

|  | wide angle | intermediate | telescopic |
| --- | --- | --- | --- |
| focal length | 4.80 | 10.60 | 23.06 |
| F number | 3.40 | 5.40 | 6.00 |
| angle of view | 87.39 | 39.19 | 17.98 |
| image height | 3.83 | 3.83 | 3.83 |
| d4 | 14.78 | 4.68 | 0.15 |
| d12 | 2.05 | 7.61 | 19.97 |
| d15 | 2.78 | 2.95 | 3.36 |
| BF | 1.63 | 1.63 | 1.63 |
| lens total length | 34.30 | 29.92 | 38.16 |

Zoom lens group data

| group | starting surface | focal length |
| --- | --- | --- |
| 1 | 1 | −11.21 |
| 2 | 6 | 9.31 |
| 3 | 11 | 20.00 |
| 4 | 14 | −33.18 | unit mm

Surface data

| surface No. | r | d | nd | νd |
| --- | --- | --- | --- | --- |
| 1 (aspheric) | −22.816 | 0.85 | 1.85135 | 40.10 |
| 2 (aspheric) | 6.982 | 1.30 | | |
| 3 | 11.559 | 1.80 | 2.00180 | 19.30 |
| 4 | 41.025 | variable | | |
| 5 (flare stop) | ∞ | 0.00 | | |
| 6 (aspheric) | 4.671 | 1.70 | 1.85135 | 40.10 |
| 7 (aspheric) | −65.725 | 0.10 | | |
| 8 | 46.200 | 1.40 | 2.00069 | 25.46 |
| 9 | 3.792 | 0.40 | | |
| 10 | 6.341 | 1.30 | 1.49700 | 81.54 |
| 11 | −16.835 | 0.50 | | |
| 12 (diaphragm) | ∞ | variable | | |
| 13 (aspheric) | −47.748 | 1.50 | 1.82080 | 42.71 |
| 14 (aspheric) | −12.377 | variable | | |
| 15 (aspheric) | −9.800 | 0.85 | 1.52540 | 56.00 |
| 16 (aspheric) | −17.470 | 0.10 | | |
| 17 | ∞ | 0.50 | 1.51633 | 64.14 |
| 18 | ∞ | 0.50 | | |
| 19 | ∞ | 0.50 | 1.51633 | 64.14 |
| 20 | ∞ | 0.37 | | |
| image plane | ∞ | | | |

Aspheric data

1st surface $K = 0.000, A4 = 4.21365E-04, A6 = -6.05646E-06, A8 = 3.50950E-08$
2nd surface $K = 0.000, A4 = -1.13220E-05, A6 = 1.03773E-06, A8 = -2.84480E-07$
6th surface $K = 0.000, A4 = -6.24213E-04, A6 = 5.54267E-06, A8 = -3.00740E-06$
7th surface $K = 0.000, A4 = 2.84968E-04, A6 = 3.60168E-06, A8 = -1.62987E-06$ 13th surface $K = 0.000, A4 = 7.69846E-04, A6 = 1.20785E-05$
14th surface $K = 0.000, A4 = 1.00811E-03, A6 = 9.29636E-06$
15th surface $K = 0.000, A4 = 3.48088E-04, A6 = -4.30433E-05$
16th surface $K = 0.000, A4 = -1.47352E-04, A6 = -2.54103E-06$

Zooming data

|  | wide angle | intermediate | telescopic |
| --- | --- | --- | --- |
| focal length | 4.80 | 9.90 | 23.05 |
| F number | 3.20 | 4.82 | 6.00 |
| angle of view | 86.90 | 42.20 | 18.10 |
| image height | 3.83 | 3.83 | 3.83 |
| d4 | 15.60 | 5.55 | 0.15 |
| d12 | 3.03 | 8.07 | 21.45 |
| d14 | 2.78 | 2.90 | 3.20 |
| BF | 1.63 | 1.63 | 1.63 |
| lens total length | 34.74 | 29.85 | 38.13 |

Zoom lens group data

| group | starting surface | focal length |
| --- | --- | --- |
| 1 | 1 | −11.61 |
| 2 | 6 | 9.70 |
| 3 | 11 | 19.97 |
| 4 | 14 | −44.17 |

NUMERICAL VALUES OF EXAMPLE 6 unit mm

Surface data

| surface No. | r | d | nd | νd |
| --- | --- | --- | --- | --- |
| 1 (aspheric) | −22.250 | 0.70 | 1.88300 | 40.80 |
| 2 (aspheric) | 9.755 | 1.80 | 1.94595 | 17.98 |
| 3 (aspheric) | 20.342 | variable | | |
| 4 (diaphragm) | ∞ | −0.40 | | |
| 5 (aspheric) | 5.106 | 2.12 | 1.80610 | 40.73 |
| 6 | 13.632 | 1.11 | 1.84666 | 23.78 |
| 7 | 4.258 | 2.49 | 1.58313 | 59.38 |
| 8 (aspheric) | 9.232 | 0.64 | | |
| 9 (shutter) | ∞ | 0.10 | | |
| 10 (flare stop) | ∞ | variable | | |
| 11 (aspheric) | −42.465 | 1.80 | 1.49700 | 81.54 |
| 12 | −6.455 | variable | | |
| 13 | −12.262 | 0.60 | 1.49700 | 81.54 |
| 14 | ∞ | 0.10 | | |
| 15 | ∞ | 0.50 | 1.51633 | 64.14 |
| 16 | ∞ | 0.50 | | |
| 17 | ∞ | 0.50 | 1.51633 | 64.14 |
| 18 | ∞ | 0.37 | | |
| image plane | ∞ | | | |

Aspheric data

1st surface $K = 0.000, A4 = -1.29130E-04, A6 = 1.65454E-05, A8 = 2.88882E-07, A10 = 1.63836E-09$ -continued unit mm 2nd surface K = −2.394, A4 = 1.03670E−04, A6 = −2.06447E−05,
A8 = 1.96386E−06, A10 = −3.52837E−08

3rd surface

K = 0.000, A4 = −2.10704E−04, A6 = 1.59927E−05,
A8 = 1.31718E−07, A10 = −7.70252E−09

5th surface

K = −1.712, A4 = 1.57142E−03, A6 = −1.95305E−05,
A8 = 5.49869E−06, A10 = −3.82174E−07

8th surface

K = 6.225, A4 = 3.33117E−03, A6 = −7.52990E−05,
A8 = 7.63477E−05, A10 = −7.48006E−06

11th surface

K = 0.000, A4 = 1.53327E−04, A6 = −7.00482E−06,
A8 = 9.89857E−07, A10 = −4.16068E−08

Zooming data

|  | wide angle | intermediate | telescopic |
|---|---|---|---|
| focal length | 6.00 | 13.50 | 24.00 |
| F number | 3.67 | 4.84 | 6.00 |
| angle of view | 73.45 | 33.14 | 18.34 |
| image height | 3.84 | 3.84 | 3.84 |
| d3 | 19.41 | 6.08 | 0.40 |
| d10 | 2.97 | 5.45 | 5.64 |
| d12 | 4.65 | 10.52 | 20.98 |
| BF | 1.68 | 1.68 | 1.68 |
| lens total length | 39.66 | 34.68 | 39.66 |

Zoom lens group data

| group | starting surface | focal length |
|---|---|---|
| 1 | 1 | −12.23 |
| 2 | 5 | 12.20 |
| 3 | 11 | 15.07 |
| 4 | 13 | −24.67 |

NUMERICAL VALUES OF EXAMPLE 7 unit mm

Surface data

| surface No. | r | d | nd | vd |
|---|---|---|---|---|
| 1 (aspheric) | −31.916 | 0.70 | 1.88300 | 40.80 |
| 2 | 7.632 | 1.80 | 1.92286 | 20.88 |
| 3 (aspheric) | 15.664 | variable | | |
| 4 (diaphragm) | ∞ | −0.40 | | |
| 5 (aspheric) | 5.220 | 2.00 | 1.80610 | 40.73 |
| 6 | 12.686 | 0.70 | 1.84666 | 23.78 |
| 7 | 4.573 | 2.54 | 1.58313 | 59.38 |
| 8 (aspheric) | 9.621 | 0.64 | | |
| 9 | ∞ | 0.10 | | |
| 10 | ∞ | variable | | |
| 11 (aspheric) | −396.815 | 1.80 | 1.49700 | 81.54 |
| 12 | −7.239 | variable | | |
| 13 | −9.978 | 0.60 | 1.49700 | 81.54 |
| 14 | −200.000 | 0.10 | | |
| 15 | ∞ | 0.50 | 1.51633 | 64.14 |
| 16 | ∞ | 0.50 | | |
| 17 | ∞ | 0.50 | 1.51633 | 64.14 |
| 18 | ∞ | 0.37 | | |
| image plane | ∞ | | | |

-continued unit mm

Aspheric data

1st surface

K = 0.000, A4 = −2.62945E−04, A6 = 1.90184E−05,
A8 = −3.10528E−07, A10 = 1.51646E−09

3rd surface

K = 0.000, A4 = −3.56970E−04, A6 = 2.20282E−05,
A8 = 4.09518E−08, A10 = −8.73126E−09

5th surface

K = −1.781, A4 = 1.62131E−03, A6 = −2.87893E−05,
A8 = 7.37740E−06, A10 = −5.30177E−0

8th surface

K = 5.175, A4 = 3.08231E−03, A6 = −8.29531E−05,
A8 = 6.39893E−05, A10 = −6.27155E−06

11th surface

K = 0.000, A4 = 1.89834E−04, A6 = −7.12802E−06,
A8 = 9.44028E−07, A10 = −3.94085E−08

Zooming data

|  | wide angle | intermediate | telescopic |
|---|---|---|---|
| focal length | 6.00 | 13.06 | 24.00 |
| F number | 3.71 | 4.79 | 6.00 |
| angle of view | 73.66 | 34.02 | 18.23 |
| image height | 3.84 | 3.84 | 3.84 |
| d3 | 19.13 | 6.28 | 0.40 |
| d10 | 2.97 | 5.18 | 5.51 |
| d12 | 5.41 | 11.02 | 21.58 |
| BF | 1.68 | 1.68 | 1.68 |
| lens total length | 39.66 | 34.63 | 39.66 |

Zoom lens group data

| group | starting surface | focal length |
|---|---|---|
| 1 | 1 | −12.03 |
| 2 | 5 | 12.98 |
| 3 | 11 | 14.81 |
| 4 | 13 | −21.15 |

FIGS. 8A through 14C are illustrations of aberrations of Examples 1 through 7 when focused at an object at infinity. More specifically, the illustrations of aberrations show the spherical aberration SA, the astigmatism AS, the distortion DT and the magnification chromatic aberration CC at (a) the wide angle end, (b) in an intermediate state and (c) at the telescopic end of each of the examples. FIY denotes the image height.

Now, the requirement values, the conditional formulas (1) through (7), and the image heights and the angles of view after distortion correction at the wide angle end of the above examples are listed below.

| Conditional formula | Example 1 | Example 2 | Example 3 | Example 4 |
|---|---|---|---|---|
| (1) | −0.68 | −0.67 | −0.64 | −0.67 |
| (2) | 1.85 | 1.85 | 1.85 | 1.85 |
| (3) | 0.41 | 0.41 | 0.53 | 0.39 |
| (4) | 0.58 | 0.60 | 0.70 | 0.65 |
| (5) | 0.42 | 0.42 | 0.41 | 0.40 |
| (6) | −0.50 | −0.50 | −0.49 | −0.49 |
| (7) | 0.22 | 0.22 | 0.22 | 0.22 |
| (8) | 4.80 | 4.80 | 4.80 | 4.80 |

-continued

| Conditional formula | Example 1 | Example 2 | Example 3 | Example 4 |
|---|---|---|---|---|
| image height after correction | 3.45 | 3.45 | 3.44 | 3.44 |
| angle of view after correction | 78.9 | 78.9 | 78.9 | 78.9 |

| Conditional formula | Example 5 | Example 6 | Example 7 |
|---|---|---|---|
| (1) | −0.71 | −0.80 | −0.76 |
| (2) | 1.85 | 1.88 | 1.88 |
| (3) | 0.41 | 0.00 | 0.00 |
| (4) | 0.53 | 0.39 | 0.61 |
| (5) | 0.42 | 0.51 | 0.54 |
| (6) | −0.50 | −0.51 | −0.50 |
| (7) | 0.22 | 0.24 | 0.22 |
| (8) | 4.80 | 4.00 | 4.00 |
| image height after correction | 3.45 | 3.46 | 3.46 |
| angle of view after correction | 78.9 | 66.8 | 66.8 |

Each of the above-described examples may alternatively be configured in a manner as described below.

The zoom lens of any of the above examples gives rise to a barrel-shaped distortion at the wide angle end on the rectangular photoelectric conversion surface. On the other hand, the appearance of such a distortion is suppressed in an intermediate focal length state and at the telescopic end. The effective imaging region may advantageously be barrel-shaped at the wide angle end and rectangular in an intermediate focal length state and at the telescopic end in order to electrically correct the distortion. Then, the predetermined effective imaging region is subjected to image conversion by means of image processing in order to convert the image information into image information of a rectangular image with a reduced distortion. The image height IHw at the wide angle end is made lower than the image height IHs in an intermediate focal length state and the image height IHt at the telescopic end.

Figure 15:
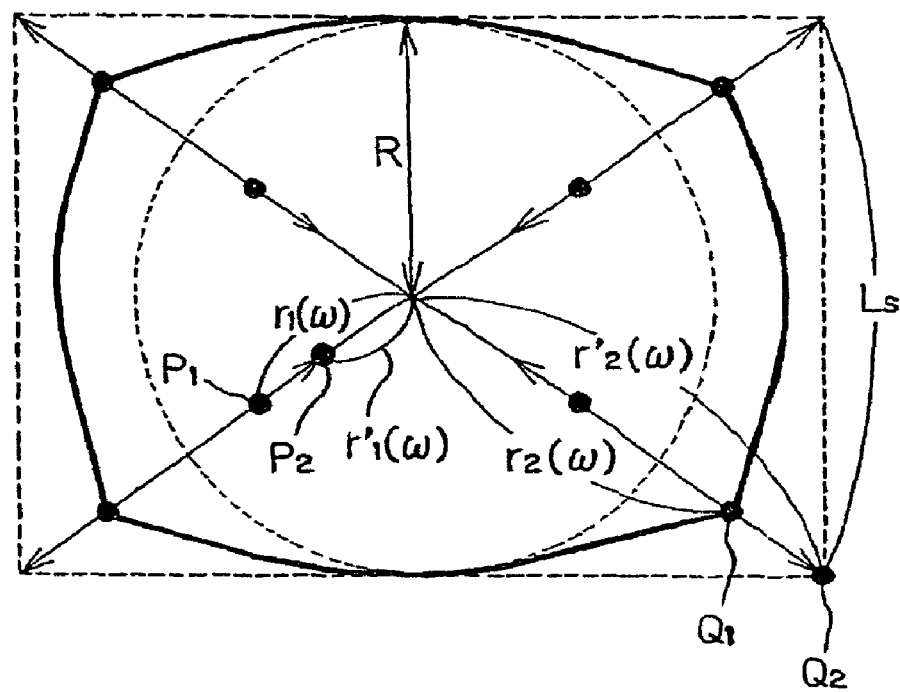
FIG. 15 is a schematic illustration of correction of distortion.

As shown in FIG. 15, the magnification is fixed on the circle (image height) of radius R that is centered at the intersection of the optical axis and the imaging plane and inscribed in the major sides of the effective imaging surface and the circle is used as reference for corrections. Then, each point on a circle (image height) of an arbitrarily selected radius $r(\omega)$ other than R is corrected by shifting it in a substantially radial direction to make it a concentric circle of radius $r'(\omega)$.

For example, point $P_1$ on the circle of an arbitrarily selected radius $r_1(\omega)$ that is found in the inside of the circle of radius R is corrected so as to become point $P_2$ on the circle of radius $r_1'(\omega)$ by shifting it toward the center of the former circle. On the other hand, point $Q_1$ on the circle of an arbitrarily selected radius $r_2(\omega)$ that is found at the outside of the circle of radius R is corrected so as to become point $Q_2$ on the circle of radius $r_2'(\omega)$ by shifting it away from the center of the former circle. $r'(\omega)$ is expressed by the formula shown below:

$$r'(\omega) = \alpha f \tan \omega \quad (0 \leq \alpha \leq 1),$$

where $\omega$ is the half angle of view and f is the focal length of the image forming optical system (zoom lens for the purpose of the present invention).

If the ideal image height corresponding to a point (image height) on a circle of radius r is Y, the following equation holds true.

$$\alpha = R/Y = R/f \tan \omega$$

The optical system is ideally rotationally symmetric relative to the optical axis and hence a distortion arises rotationally symmetrically relative to the optical axis. Therefore, when the distortion that takes place optically is to be corrected electrically, it is believed to be advantageous from the viewpoint of quantity of data and amount of computations if it is possible to fix the magnification on the circle (image height) of radius R that is centered at the intersection of the optical axis and the imaging plane and inscribed in the major sides of the effective imaging surface and correct each point on a circle (image height) of an arbitrarily selected radius $r(\omega)$ other than R by shifting it in a substantially radial direction to make it a concentric circle of radius $r'(\omega)$ as pointed out above.

However, an optical image is no longer a continuous quantity when it is picked up by an electronic image pickup element (because of sampling). Therefore, the circle that is to be drawn rigorously precisely on an optical image is not a precise circle so long as the pixels on the electronic image pickup element are not arranged radially. In other words, there is not any circle that can fix the above magnification for correcting the shape of image data expressed for each discrete coordinate point. Therefore, a method of determining the destination coordinates $(X'_i, Y'_j)$ for each pixel $(X_i, Y_j)$ is preferably employed. When two points $(X_i, Y_j)$ are moved to the same coordinates $(X'_i, Y'_j)$, the average value of the values the pixels has will be used. When there is not any destination point, it can be determined by interpolation using the values of the coordinates $(X'_i, Y'_j)$ of several pixels surrounding it.

Such a method is effective for corrections when the circle of radius R drawn on the optical image is asymmetric because the distortion is remarkable relative to the optical axis in an electronic image pickup apparatus having a zoom lens due to manufacturing errors of the optical system and the electronic image pickup element. Such a method is also effective for corrections when geometric distortion or the like occurs at the time of converting a signal into an image by an image pickup element or various output devices.

In an electronic image pickup apparatus according to the present invention, $r(\omega)$, namely the relationship between the half angle of view and the image height, or the relationship between the real image height r and the ideal image height $r'/\alpha$ for computing the correction quantity $r'(\omega) - r(\omega)$ may be stored in a recording medium contained in the electric image pickup apparatus.

The radius R preferably satisfies the requirements of the conditional formula shown below in order to avoid a situation where the image is extremely short of quantity of light at the opposite extremities in the direction of the minor sides after correcting the distortion:

$$0 \leq R \leq 0.6 L_s,$$

where $L_s$ is the length of the minor sides of the effective imaging plane.

Preferably, the radius R satisfies the requirements of the conditional formula shown below.

$$0.3 L_s \leq R \leq 0.6 L_s$$

It is most advantageous to make the radius R agree with the radius of the circle substantially inscribed in the minor sides of the effective image plane. While it may be slightly disadvantageous in terms of effective number of pixels in the case of a correction where the magnification is fixed at or near the radius R=0, or at or near the axis, the downsizing effect can be ensured if the angle of view is increased.

The focal length range that requires correction may be divided into several focus zones and the correction quantity same as the one that gives rise to a result of correction that satisfies the requirement of $$r'(\omega)=\alpha f \tan \omega$$

at or near the telescopic end in the focus zones produced by the division may be used for the correction. Note, however, the barrel-shaped distortion may remain to a certain extent at the wide angle end in the divided focus zones. Additionally, it is not preferable to produce an excessively large number of divided focus zones because unique data necessary for corrections may then have to be stored in the recording medium excessively. To cope with this problem, one or several coefficients that are related to each focal length in the divided focus zones may well be computationally determined in advance. The coefficients may be determined by simulations and/or measurements using a real apparatus. Then, the correction quantity that can obtain a result of correction that substantially satisfies the requirement of $$r'(\omega)=\alpha f \tan \omega$$

may be computed at or near the telescopic end in the divided zones and uniformly multiplied by the coefficients for each focal length to determine the final correction quantity.

Meanwhile, when the image obtained by focusing an object at infinity, the equation shown below holds true:

$$f=y/\tan \omega,$$

where y is the height of an image point from the optical axis (image height), f is the focal length of the imaging system (zoom lens according to the present invention) and $\omega$ is the angle between the direction toward the point on the object that corresponds to the image point focused at position separated by y from the center of the imaging plane and the optical axis (half angle of view of the target).

When the focusing system involves a barrel-shaped distortion, the relationship of $$f>y/\tan \omega$$

holds true. In other words, the value of $\omega$ is large if the focal length f of the focusing system and the image height y are constant.

Preferably, an image pickup apparatus according to the present invention preferably has an image conversion section for converting the electric signals of the image picked up by the zoom lens into video signal that is corrected for the color misregistration due to the magnification chromatic aberration produced by image processing. A better image can be obtained by electrically correcting the magnification chromatic aberration of the zoom lens.

Generally, in electronic still cameras, a color image is decomposed into images of the three primary colors including the first primary color, the second primary color and the third primary color and the output signals of the primary color images are computationally overlapped in order to reproduce the original color image. When the zoom lens involves magnification chromatic aberration and the image of the first primary color formed by light is used as reference, the position where the image of the second primary color is formed by light and the position where the image of the third primary color is formed by light are displaced from the position where the image of the first primary color is formed. To electronically correct the magnification chromatic aberration of an image, the quantity of displacement of the image of the second primary color formed by light and that of the image of the third primary color formed by light are determined in advance for each pixel of the image pickup element according to the aberration information on the zoom lens. Then, an operation of coordinate conversion is conducted for each pixel of the picked up image so as to compensate the quantity of displacement relative to the image of the first primary color by correction.

For example, when the output signal of an image contains information on the three primary colors of red (R), green (G) and blue (B), the displacement of the position of the R image and that of the position of the B image relative to the G image are determined for each pixel and an operation of coordinate conversion is conducted on the picked up image so as to eliminate the displacements relative to G before outputting signals for R and B.

The magnification chromatic aberration changes according to zooming, focusing and the aperture value. Preferably, the quantity of displacement of the second primary color and that of the third primary color relative to the first primary color are stored in a memory device as correction data for each lens position (in terms of zooming, focusing and the aperture value). Then, a second primary color signal and a third primary color signal obtained by correcting the displacement of the second primary color and that of the third primary color can be output in response to the selected zoom position by referring to the correction data.

A flare stop may be provided in addition to an aperture stop in order to cut out unnecessary light including ghost and flare.

A flare stop may be arranged at the object side of the first lens group, between the first and second lens groups, between the second and third lens groups, between the third and fourth lens groups, between the fourth and fifth lens groups or between the lens group at the image side extremity and the image plane. Alternatively, the frame member may be so formed as to cut flare of light or an additional member may be provided. Still alternatively, a flare stop may be formed by directly printing or painting on the optical system or bonding a seal onto the optical system. The flare stop may have any shape. For example, it may be circular, elliptic, rectangular, polygonal or a shape surrounded by curves defined by functions. The flare stop may be so designed as to cut not only harmful light but also comatic flare of peripheral part of the image.

For the purpose of the present invention, an anti-reflection coat may be put on lenses to reduce ghost and flare. The use of a multi-coat is preferable because it can effectively reduce ghost and flare. An infrared cut coat may be formed on lens surfaces and cover glasses.

The shading of peripheral part of an image can be reduced by shifting the CCD micro-lenses. For example, the design of the CCD micro-lenses may be altered according to the incident angle of rays of light for each image height. The reduced quantity of light of peripheral part of an image can be corrected by image processing.

It is a general practice to put an anti-reflection coat on lens surfaces exposed to air in order to prevent ghost and flare from taking place. On the other hand, the refractive index of the adhesive at the cemented surface of a cemented lens is sufficiently higher than the refractive index of air. For this reason, the reflectance of a cemented lens is in many cases substantially same as or lower than the reflectance of a single layer coat so that the cemented lens may not need any coat. However, ghost and flare can be reduced further to provide high quality images by putting an anti-reflection coat on the cemented surface.

Particularly, high refractive index glass materials have become popular in recent years and are widely being used for camera optical systems because of their high aberration correcting effect. However, the reflection at a cemented surface is not negligible when such a high refractive index glass material is used for a cemented lens. Thus, an anti-reflection coat formed on a cemented surface will be highly effective.

Techniques for effectively using a cemented surface coat are disclosed in JP-A-02-027301, JP-A-2001-324676, JP-A-2005-92115, U.S. Pat. No. 7,116,482 and so on.

For the purpose of the present invention, the coat material may be selected appropriately from relatively high refractive index coat materials such as $Ta_2O_5$, $TiO_2$, $Nb_2O_5$, $ZrO_2$, $HfO_2$, $CeO_2$, $SnO_2$, $In_2O_3$, ZnO and $Y_2O_3$ and relatively low refractive index coat materials such as $MgF_2$, $SiO_2$ and $Al_2O_3$ according to the refractive index of the lens that operates as base and the refractive index of the adhesive and the coat thickness may be determined appropriately so as to satisfy the phase conditions.

It may be needless to say that a multi-coat may be used as coat for cemented surfaces as in the case of lens surfaces exposed to air. The reflectance can be reduced further and both the spectral characteristics and the angle characteristics of the reflectance can be controlled by appropriately combining two or more than two coat layers and hence two or more than two coat thicknesses. The cemented surfaces of the lens groups other than the first lens group may also be coated according to the same idea.

Figure 16:
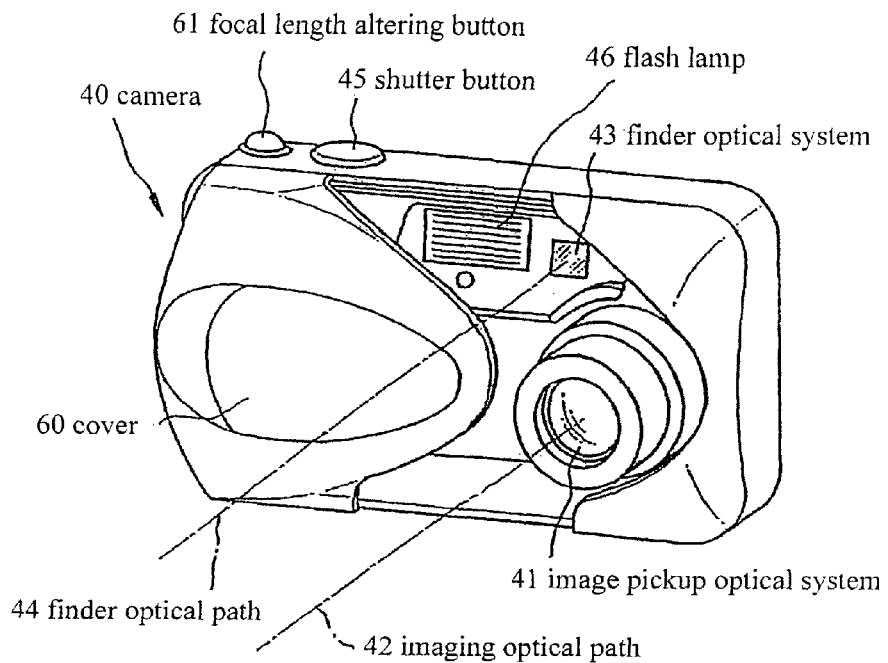
FIG. 16 is a perspective front view of a digital camera according to the present invention, showing the appearance thereof.
Figure 17:
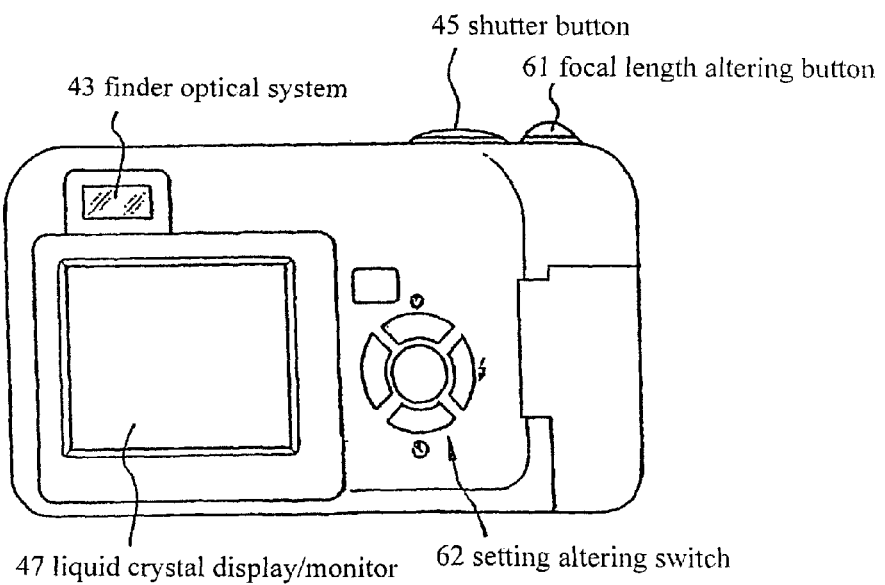
FIG. 17 is a perspective back view of the digital camera of FIG. 16.
Figure 18:
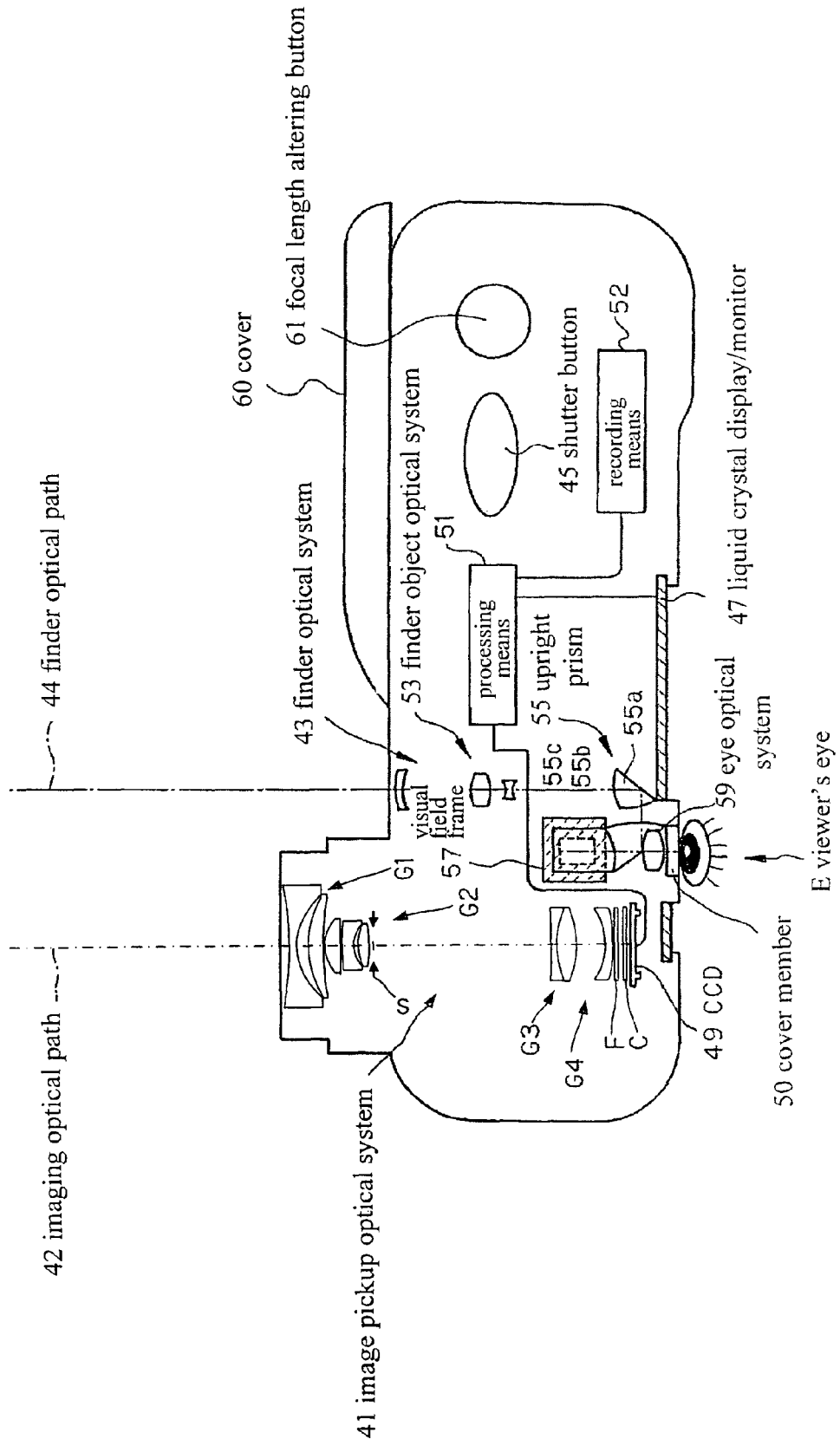
FIG. 18 is a schematic cross-sectional view of the digital camera of FIG. 16.

FIGS. 16 through 18 are conceptual illustrations of a digital camera including a zoom lens according to the present invention incorporated into the image pickup optical system 41. FIG. 16 is a perspective front view of a digital camera 40 according to the present invention, showing the appearance thereof. FIG. 17 is a perspective back view of the digital camera 40 of FIG. 16. FIG. 18 is a schematic cross-sectional view of the digital camera 40 of FIG. 16. Note that FIGS. 16 and 18 are views when the lens barrel is retracted.

In this instance, the digital camera 40 includes an image pickup optical system 41 arranged on the imaging optical path 42, a finder optical system 43 arranged on the finder optical path 44, a shutter button 45, a flash lamp 46, a liquid crystal display/monitor 47, a focal length altering button 61, a setting altering switch 62 and the like. When the lens barrel of the image pickup optical system 41 is retracted, the image pickup optical system 41, the finder optical system 43 and the flash lamp 46 come to be covered as the cover 60 is driven to slide. As the cover 60 is opened and the camera 40 is set ready for an image pickup operation, the lens barrel of the image pickup optical system 41 is driven to move outwardly from the retracted position as shown in FIG. 16. Then, as the shutter button 45 arranged at the top of the camera 40 is depressed, the image pickup optical system 41 operates accordingly so that an image is picked up by way of the zoom lens of Example 1, for example, and the image of an object is formed on the imaging plane (photoelectric conversion plane) of the CCD 49 by way of the low pass filter F that is equipped with a wavelength range limiting coat and a cover glass C by the image pickup optical system 41.

The image of the object formed by light received by the CCD 49 is then displayed on the liquid crystal display/monitor 47 arranged on the back surface of the camera as electronic image by way of a processing means 51. The processing means 51 for the liquid crystal display/monitor 47 may be connected to a recording means 52 so as to record the picked up electronic image. The recording means 52 may be a unit separate from the processing means 51. It may be so arranged that the electronic image is electronically recorded/written on a floppy Disk®, a memory card or an MO. The CCD 49 may be replaced by a silver salt film camera using a silver salt film.

A finder objective optical system 53 is arranged on the finder optical path 44. The finder objective optical system 53 is formed by a plurality of lens groups (four groups in the illustrated instance) and an upright prism system 55 including upright prisms 55a, 55b and 55c. It is a zooming optical system interlocked with the zoom lens of the image pickup optical system 41 to change the focal length. The image of an object picked up by the finder objective optical system 53 is made to appear in the visual field frame 57 of the upright prism system 55 that is an image erection member. An eye optical system 59 for leading the picked up image that is an upright image to a viewer's eye E is arranged behind the upright prism system 55. A cover member 50 is arranged at the light-exiting side of the of the eye optical system 59.

Figure 19:
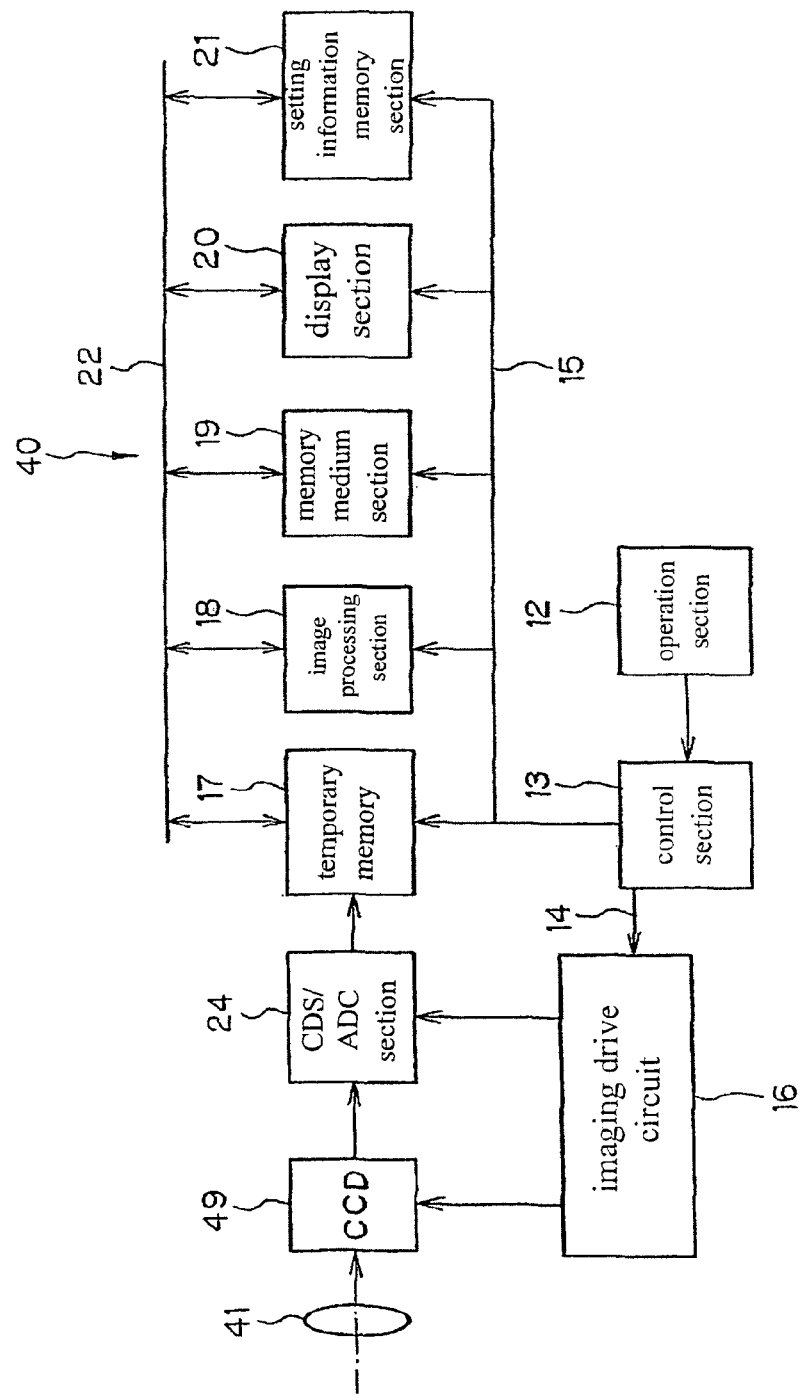
FIG. 19 is a schematic block diagram of the internal circuit of a principal part of the digital camera of FIG. 16, showing the configuration thereof.

FIG. 19 is a schematic block diagram of the internal circuit of a principal part of the above-described digital camera 40, showing the configuration thereof. The above-described processing means 51 typically includes a CDS/ADC section 24, a temporary memory 17 and an image processing section 18, and the memory means 52 typically includes a memory medium section 19.

As shown in FIG. 19, the digital camera 40 has an operation section 12, a control section 13 connected to the operation section 12, an imaging drive circuit 16, a temporary memory 17, the imaging drive circuit 16 and the temporary memory 17 being connected to a control signal output port of the control section 13 respectively by way of buses 14 and 15, an image processing section 18, a memory medium section 19, a display section 20 and a setting information memory section 21.

The above-listed temporary memory 17, the image processing section 18, the memory medium section 19, the display section 20 and the setting information memory section 21 are so arranged as to be able to input data from and output data to each other by way of a bus 22. The imaging drive circuit 16 is connected to the CCD 49 and the CDS/ADC section 24.

The operation section 12 has various input buttons and switches. It is a circuit for notifying the event information that is externally input (from a camera user) by way of any of the input buttons and the switches to the control section. The control section 13 is a central processing unit (CPU) that contains a program memory (not shown) and controls the entire digital camera 40 according to the programs stored in the program memory in response to an instruction input by the camera user by way of the operation section 12.

The CCD 49 receives the image of an object formed by way of the image pickup optical system 41 as light. The CCD 49 is driven to operate by the imaging drive circuit 16. It is an image pickup element that converts the quantity of light of each pixel of the image of the object into electric signals and outputs them to the CDS/ADC section 24.

The CDS/ADC section 24 is a circuit that amplifies the electric signals input from the CCD 49, converts the electric signals into digital signals by analog/digital conversion and then outputs the video raw data (bayer data, to be referred to as RAW data hereinafter) obtained simply by amplification and analog/digital conversion to the temporary memory 17.

The temporary memory 17 is a buffer typically formed by a SDRAM. It is a memory device that temporarily stores the RAW data output from the CDS/ADC section 24. The image processing section 18 is a circuit that reads out the RAW data stored in the temporary memory 17 or the RAW data stored in the memory medium section 19 and electrically executes various image processing operations including those of correcting distortion according to the image quality parameter specified by the control section 13.

The memory medium section 19 is a control circuit of a device that is to be removably mounted by a recording medium that may be a card type or stick type memory medium such as a flash memory to store and hold the RAW data transferred from the temporary memory 17 and the image data subjected to an image processing operation in the image processing section 18.

The display section 20 is a circuit that includes a liquid crystal display/monitor 47 so as to display an image or an operation menu on the liquid crystal display/monitor 47. The setting information memory section 21 includes a ROM section that stores various image quality parameters in advance and a RAM section that stores the image quality parameter selected from the image parameters read out from the ROM section by an input operation at the operation section 12. The setting information memory section 21 is a circuit that controls the inputs to and the outputs from those memories.

In the digital camera 40 having the above-described configuration, the image pickup optical system 41 has a sufficient wide angle range according to the present invention and shows a stable image forming performance over the entire variable power range with a high variable power ratio, although it is very compact. Thus, according to the present invention, it is possible to realize a high performance, compact and wide angle camera. Additionally, a digital camera according to the present invention can operate for quick focusing both at the wide angle side and at the telescopic side.

The present invention is applicable not only to so-called general purpose compact digital cameras but also to monitor cameras that need a wide angle of view and lens-interchangeable cameras.

What is claimed is:

1. A zoom lens comprising:
   a first lens group of negative refractive power;
   a second lens group of positive refractive power;
   a third lens group of positive refractive power; and
   a fourth lens group of negative refractive power arranged in the above-mentioned order from the object side to the image side;
   at least the first lens group, the second lens group and the third lens group being driven to move and change the gaps separating the lens groups at the time for the zoom lens to be driven to zoom from the wide angle end to the telescopic end;
   the first lens group comprising a negative lens component of negative refractive power and a positive lens component of positive refractive power arranged on the optical axis in the above-mentioned order from the object side to the image side with a gap separating them;
   the total number of lens components in the first lens group being two;
   the second lens group comprising a negative lens, a first positive lens and a second positive lens;
   the fourth lens group comprising a negative lens component having a concave surface directed to the object side;
   the total number of lens components of the fourth lens group being one;
   the negative lens component in the first lens group and the negative lens component in the fourth lens group satisfying the requirements of conditional formula (1) shown below:

$$-0.80 < r_{G1nr}/r_{G4nf} < -0.40 \quad (1),$$

where
$r_{G1nr}$ is the radius of paraxial curvature of the image side surface of the negative lens component in the first lens group; and
$r_{G4nf}$ is the radius of paraxial curvature of the object side surface of the negative lens component in the fourth lens group.

2. The zoom lens according to claim 1, wherein the second lens group comprises the first positive lens, the negative lens and the second positive lens arranged sequentially in the above-mentioned order from the object side to the image side.

3. The zoom lens according to claim 1, wherein the total number of lenses of the second lens group is three.

4. The zoom lens according to claim 1, wherein the negative lens component of the first lens group satisfies the requirements of conditional formula (2) shown below:

$$1.78 < nd_{G1n} < 2.40 \quad (2),$$

where
$nd_{G1n}$ is the refractive index of any of the negative lenses in the negative lens component of the first lens group at d line.

5. The zoom lens according to claim 1, wherein both the image side surface of the negative lens component of the first lens group and the object side surface of the fourth lens group are concave and aspheric.

6. The zoom lens according to claim 1, wherein both the negative lens component and the positive lens component of the first lens group are single lenses.

7. The zoom lens according to claim 1, wherein the third lens group and the fourth lens group are formed by respective single lens components.

8. The zoom lens according to claim 7, wherein the third lens group and the fourth lens group are formed by respective single lenses.

9. The zoom lens according to claim 1, wherein satisfying the requirements of conditional formula (3) shown below:

$$0.1 < D_{G1np}/D_{G3G4} < 1.0 \quad (3),$$

where
$D_{G1np}$ is the distance between the negative lens component and the positive lens component of the first lens group on the optical axis; and
$D_{G3G4}$ is the distance between the third lens group and the fourth lens group on the optical axis at the telescopic end.

10. The zoom lens according to claim 1, wherein the negative lens component of the first lens group satisfies the requirements of conditional formula (4) shown below:

$$-1.0 < (r_{G1nf} + r_{G1nr})/(r_{G1nf} - r_{G1nr}) < 0.75 \quad (4),$$

where
$r_{G1nf}$ is the radius of paraxial curvature of the object side surface of the negative lens component of the first lens group; and
$r_{G1nr}$ is the radius of paraxial curvature of the image side surface of the negative lens component of the first lens group.

11. The zoom lens according to claim 1, wherein the second lens group satisfies the requirements of conditional formula (5) shown below:

$$0.10 < f_{G2}/ft < 0.55 \quad (5),$$

where $f_{G2}$ is the focal length of the second lens group; and ft is the focal length of the entire optical system of the zoom lens at the telescopic end.

12. The zoom lens according to claim 1, wherein the first lens group satisfies the requirements of conditional formula (6) shown below:

$$-0.70 < f_{G1}/ft < -0.20 \quad (6),$$

where $f_{G1}$ is the focal length of the first lens group; and ft is the focal length of the entire optical system of the zoom lens at the telescopic end.

13. The zoom lens according to claim 1, wherein the second lens group satisfies the requirements of conditional formula (7) shown below:

$$0.01 < \sigma_{G2}/ft < 0.25 \quad (7),$$

where $\sigma_{G2}$ is the thickness of the second lens group on the optical axis; and ft is the focal length of the entire optical system of the zoom lens at the telescopic end.

14. The zoom lens according to claim 1, wherein satisfying the requirements of conditional formula (8) shown below:

$$3.0 < ft/fw < 20.0 \quad (8),$$

where ft is the focal length of the entire optical system of the zoom lens at the telescopic end; and fw is the focal length of the entire optical system of the zoom lens at the wide angle end.

15. The zoom lens according to claim 14, wherein the lens groups of the zoom lens are only the first lens group, the second lens group, the third lens group and the fourth lens group.

16. The zoom lens according to claim 1, further comprising:

an aperture stop adapted to be driven to move integrally with the second lens group at the time for the zoom lens to be driven to zoom from the wide angle end to the telescopic end.

17. The zoom lens according to claim 1, wherein only the third lens group is driven to move toward the object side at the time for the zoom lens to be driven to shift the focus from a remote object to a nearby object.

18. The zoom lens according to claim 1, wherein the third lens group comprises a cemented lens component having a negative lens and a positive lens.

19. The zoom lens according to claim 1, wherein the fourth lens group comprises a plastic single lens; and the total number of lenses of the fourth lens group is one.

20. An image pickup apparatus comprising:

a zoom lens; and an image pickup element that has an imaging plane arranged at the image side of the zoom lens and converts the optical image on the imaging plane into electric signals;

the zoom lens being a zoom lens according to claim 1.

21. The image pickup apparatus according to claim 20, wherein the fourth lens group is fixed relative to the imaging plane when zooming from the wide angle end to the telescopic end.

22. The image pickup apparatus according to claim 20, further comprising:

an image conversion section that converts the electric signals including distortion due to the zoom lens into video signals in which the distortion is corrected by image processing.

23. The image pickup apparatus according to claim 22, wherein the image conversion section converts the electric signals including magnification chromatic aberration due to the zoom lens into video signals in which the magnification chromatic aberration is corrected by image processing.

24. A zoom lens comprising:

a first lens group of negative refractive power;

a second lens group of positive refractive power;

a third lens group of positive refractive power; and a fourth lens group of negative refractive power arranged in the above-mentioned order from the object side to the image side;

at least the first lens group, the second lens group and the third lens group being driven to move and change the gaps separating the lens groups at the time for the zoom lens to be driven to zoom from the wide angle end to the telescopic end;

the first lens group comprising a negative lens component of negative refractive power and a positive lens component of positive refractive power arranged sequentially on the optical axis in the above-mentioned order from the object side to the image side with a gap separating them;

the total number of lens components in the first lens group being two;

the second lens group comprising a negative lens, a first positive lens and a second positive lens;

the negative lens component of the first lens group comprising negative lenses satisfying the requirements of conditional formula (2') shown below:

$$1.85 < nd_{G1n} < 2.40 \quad (2'),$$

where $nd_{G1n}$ is the refractive index of any of the negative lenses in the negative lens component of the first lens group at d line.

25. A zoom lens comprising:

a first lens group of negative refractive power;

a second lens group of positive refractive power;

a third lens group of positive refractive power; and a fourth lens group of negative refractive power arranged in the above-mentioned order from the object side to the image side;

at least the first lens group, the second lens group and the third lens group being driven to move and change the gaps separating the lens groups at the time for the zoom lens to be driven to zoom from the wide angle end to the telescopic end;

the first lens group comprising a negative lens component of negative refractive power and a positive lens component of positive refractive power arranged sequentially on the optical axis in the above-mentioned order from the object side to the image side with a gap separating them;

the total number of lens components in the first lens group being two;

the second lens group comprising a negative lens, a first positive lens and a second positive lens;

the negative lens component of the first lens group comprising negative lenses satisfying the requirements of conditional formula (2) shown below:

$$1.78 < nd_{G1n} < 2.40 \quad (2),$$

where
nd$_{G1n}$ is the refractive index of any of the negative lenses in the negative lens component of the first lens group at d line, wherein the second lens group comprises the first positive lens, the negative lens and the second positive lens arranged sequentially in the above mentioned order from the object side to the image side.

26. A zoom lens comprising:

a first lens group of negative refractive power;

a second lens group of positive refractive power;

a third lens group of positive refractive power; and a fourth lens group of negative refractive power arranged in the above-mentioned order from the object side to the image side;

at least the first lens group, the second lens group and the third lens group being driven to move and change the gaps separating the lens groups at the time for the zoom lens to be driven to zoom from the wide angle end to the telescopic end;

the first lens group comprising a negative lens component of negative refractive power and a positive lens component of positive refractive power arranged sequentially on the optical axis in the above-mentioned order from the object side to the image side with a gap separating them;

the total number of lens components in the first lens group being two;

the second lens group comprising a negative lens, a first positive lens and a second positive lens;

the negative lens component of the first lens group comprising negative lenses satisfying the requirements of conditional formula (2) shown below:

$$1.78 < nd_{G1n} < 2.40 \qquad (2),$$

where
nd$_{G1n}$ is the refractive index of any of the negative lenses in the negative lens component of the first lens group at d line, wherein the total number of lenses of the second lens group is three.

27. A zoom lens comprising:

a first lens group of negative refractive power;

a second lens group of positive refractive power;

a third lens group of positive refractive power; and a fourth lens group of negative refractive power arranged in the above-mentioned order from the object side to the image side;

at least the first lens group, the second lens group and the third lens group being driven to move and change the gaps separating the lens groups at the time for the zoom lens to be driven to zoom from the wide angle end to the telescopic end;

the first lens group comprising a negative lens component of negative refractive power and a positive lens component of positive refractive power arranged sequentially on the optical axis in the above-mentioned order from the object side to the image side with a gap separating them;

the total number of lens components in the first lens group being two;

the second lens group comprising a negative lens, a first positive lens and a second positive lens;

the negative lens component of the first lens group comprising negative lenses satisfying the requirements of conditional formula (2) shown below:

$$1.78 < nd_{G1n} < 2.40 \qquad (2),$$

where
nd$_{G1n}$ is the refractive index of any of the negative lenses in the negative lens component of the first lens group at d line, wherein the fourth lens group comprises a negative lens component, and the total number of lens components of the fourth lens group is one.

28. A zoom lens comprising:

a first lens group of negative refractive power;

a second lens group of positive refractive power;

a third lens group of positive refractive power; and a fourth lens group of negative refractive power arranged in the above-mentioned order from the object side to the image side;

at least the first lens group, the second lens group and the third lens group being driven to move and change the gaps separating the lens groups at the time for the zoom lens to be driven to zoom from the wide angle end to the telescopic end;

the first lens group comprising a negative lens component of negative refractive power and a positive lens component of positive refractive power arranged on the optical axis in the above-mentioned order from the object side to the image side with a gap separating them;

the total number of lens components in the first lens group being two;

the second lens group comprising a negative lens, a first positive lens and a second positive lens;

the fourth lens group comprising a negative lens component;

the total number of lens components of the fourth lens group being one;

the zoom lens satisfying the requirements of conditional formula (8-1) shown below:

$$4.0 < ft/fw < 20.0 \qquad (8\text{-}1),$$

where
ft is the focal length of the entire optical system of the zoom lens at the telescopic end, and fw is the focal length of the entire optical system of the zoom lens at the wide angle end.

29. The zoom lens according to claim 28, wherein the second lens group comprises the first positive lens, the negative lens and the second positive lens arranged sequentially in the above-mentioned order from the object side to the image side.

30. The zoom lens according to claim 28, wherein the total number of lenses of the second lens group is three.

31. A zoom lens comprising:

a first lens group of negative refractive power;

a second lens group of positive refractive power;

a third lens group of positive refractive power; and a fourth lens group of negative refractive power arranged in the above-mentioned order from the object side to the image side;

at least the first lens group, the second lens group and the third lens group being driven to move, the fourth lens group being fixed, and change the gaps separating the lens groups at the time for the zoom lens to be driven to zoom from the wide angle end to the telescopic end;

the first lens group comprising a negative lens component of negative refractive power arranged at the extremity of the object side in the first lens group;

the second lens group comprising a negative lens, a first positive lens and a second positive lens;

the fourth lens group comprising a negative lens component having a concave surface directed to the object side;

the total number of lens components of the fourth lens group being one;

the negative lens component in the first lens group and the negative lens component in the fourth lens group satisfying the requirements of conditional formula (1) shown below:

$$-0.80 < r_{G1nr}/r_{G4nf} < -0.40 \quad (1),$$

where $r_{G1nr}$ is the radius of paraxial curvature of the image side surface of the negative lens component in the first lens group; and $r_{G4nf}$ is the radius of paraxial curvature of the object side surface of the negative lens component in the fourth lens group.

32. The zoom lens according to claim 31, wherein the second lens group comprises the first positive lens, the negative lens and the second positive lens arranged sequentially in the above-mentioned order from the object side to the image side.

33. The zoom lens according to claim 31, wherein the total number of lenses of the second lens group is three.

34. A zoom lens comprising:

a first lens group of negative refractive power;

a second lens group of positive refractive power;

a third lens group of positive refractive power; and a fourth lens group of negative refractive power arranged in the above-mentioned order from the object side to the image side;

at least the first lens group, the second lens group and the third lens group being driven to move and change the gaps separating the lens groups at the time for the zoom lens to be driven to zoom from the wide angle end to the telescopic end;

the first lens group comprising a negative lens component of negative refractive power arranged at the extremity of the object side in the first lens group;

the second lens group comprising a negative lens, a first positive lens and a second positive lens;

the fourth lens group comprising a negative lens component having a concave surface directed to the object side;

the total number of lens components of the fourth lens group being one;

the zoom lens satisfying the requirements of conditional formula (8-1) shown below:

$$4.0 < ft/fw < 20.0 \quad (8\text{-}1),$$

where ft is the focal length of the entire optical system of the zoom lens at the telescopic end, and fw is the focal length of the entire optical system of the zoom lens at the wide angle end, wherein the first lens group has a positive lens.

35. The zoom lens according to claim 34, wherein the total number of lenses of the second lens group is three.

36. A zoom lens comprising:

a first lens group of negative refractive power;

a second lens group of positive refractive power;

a third lens group of positive refractive power; and a fourth lens group of negative refractive power arranged in the above-mentioned order from the object side to the image side;

at least the first lens group, the second lens group and the third lens group being driven to move and change the gaps separating the lens groups at the time for the zoom lens to be driven to zoom from the wide angle end to the telescopic end;

the first lens group comprising a negative lens component of negative refractive power arranged at the extremity of the object side in the first lens group;

the second lens group comprising a negative lens, a first positive lens and a second positive lens;

the fourth lens group comprising a negative lens component having a concave surface directed to the object side;

the total number of lens components of the fourth lens group being one;

the zoom lens satisfying the requirements of conditional formula (8-1) shown below:

$$4.0 < ft/fw < 20.0 \quad (8\text{-}1),$$

where ft is the focal length of the entire optical system of the zoom lens at the telescopic end, and fw is the focal length of the entire optical system of the zoom lens at the wide angle end, wherein the second lens group comprises the first positive lens, the negative lens and the second positive lens arranged sequentially in the above-mentioned order from the object side to the image side.

* * * * *